(12) United States Patent
Brady et al.

(10) Patent No.: US 11,853,506 B1
(45) Date of Patent: Dec. 26, 2023

(54) TOUCH DRIVING APPARATUS, TOUCH CONTROL APPARATUS AND TOUCH DRIVING METHOD

(71) Applicant: Beijing ESWIN Computing Technology Co., Ltd., Beijing (CN)

(72) Inventors: Keith Rowland Charles Brady, Beijing (CN); Konstantinos Theodoropoulos, Beijing (CN)

(73) Assignee: Beijing ESWIN Computing Technology Co., Ltd., Beijing (CN)

( * ) Notice: Subject to any disclaimer, the term of this patent is extended or adjusted under 35 U.S.C. 154(b) by 0 days.

(21) Appl. No.: 18/166,317

(22) Filed: Feb. 8, 2023

(30) Foreign Application Priority Data

Jun. 28, 2022 (CN) .......................... 202210751229.3

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01)

(58) Field of Classification Search
CPC .............................. G06F 3/04166; G06F 3/044
See application file for complete search history.

(56) References Cited

U.S. PATENT DOCUMENTS

| 2015/0355765 A1* | 12/2015 | Fukushima | ........... G06F 3/0412 345/174 |
|---|---|---|---|
| 2018/0329569 A1* | 11/2018 | Suzuki | ................ G06F 3/04166 |
| 2023/0288762 A1* | 9/2023 | Koide | ................... H01L 27/124 345/174 |

* cited by examiner

*Primary Examiner* — Chanh D Nguyen
*Assistant Examiner* — Ngan T. Pham-Lu
(74) *Attorney, Agent, or Firm* — Leason Ellis LLP

(57) ABSTRACT

A touch driving apparatus, a touch control apparatus and a touch driving method are provided. The touch driving apparatus includes at least one output module. Each output module comprises at least two output stage circuits, each having an output terminal configured to output a driving signal to a connected driving electrode. The method includes: for each output module, determining a first and a second output stage circuit groups in the current driving time period according to a CDM code matrix. A first driving signal group corresponding to the first output stage circuit group is expected to discharge a first driving electrode group, and a second driving signal group corresponding to the second output stage circuit group is expected to charge a second driving electrode group; and controlling utilizing power from the first driving electrode group to charge the second driving electrode group, in response to the determination.

18 Claims, 11 Drawing Sheets

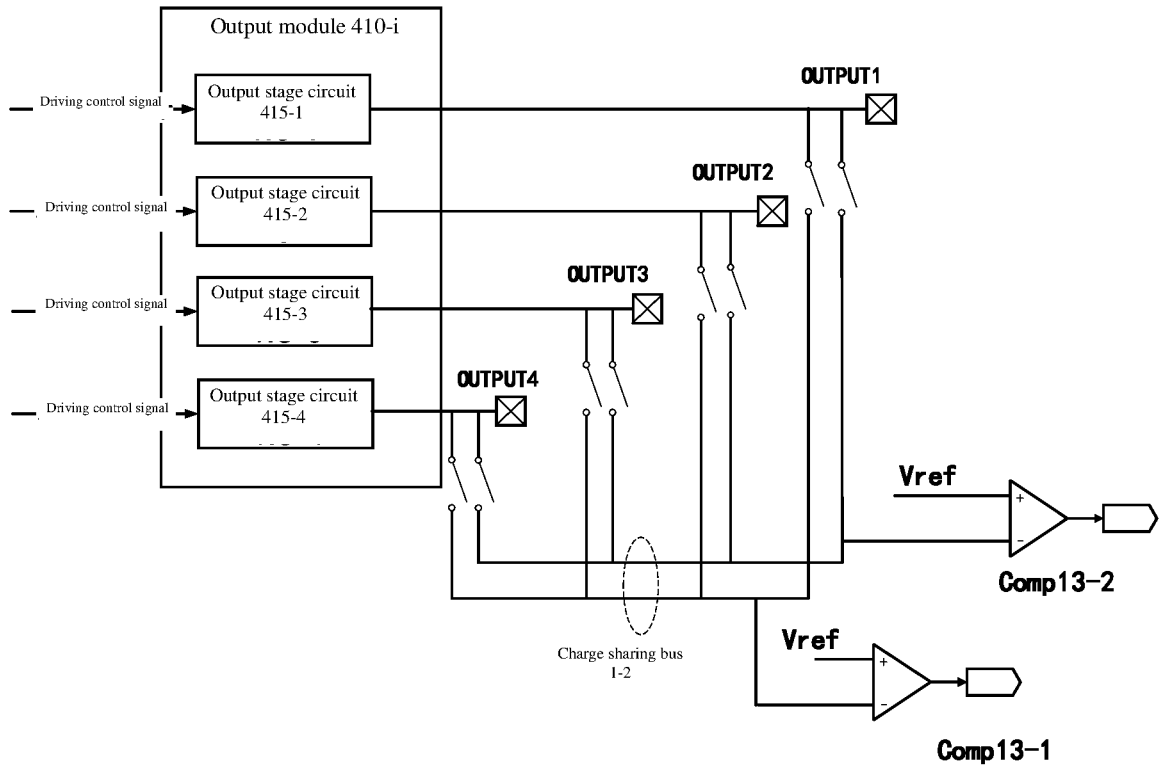

Determining a first output stage circuit group and a second output stage circuit group in the current driving time period according to a Code Division Multiple Access (CDM) code matrix, wherein, a first driving signal group at an output terminal of the first output stage circuit group is expected to discharge a first driving electrode group, and a second driving signal group at an output terminal of the second output stage circuit group is expected to charge a second driving electrode group

S1420

In response to the determination, controlling utilizing power from the first driving electrode group to charge the second driving electrode group

FIG. 14

TOUCH DRIVING APPARATUS, TOUCH CONTROL APPARATUS AND TOUCH DRIVING METHOD

CROSS REFERENCES TO RELATED APPLICATIONS

The present application claims the priority of the Chinese patent application No. 202210751229.3 filed on Jun. 28, 2022, for all purposes, the disclosure of which is incorporated herein by reference in its entirety as part of the present application.

TECHNICAL FIELD

The present disclosure relates to a field of touch control, and more particularly, to a touch driving apparatus, a touch control apparatus, and a touch driving method.

BACKGROUND

In recent years, a touch control apparatus including a so-called touch panel capable of detecting external approaching objects has attracted attention. For example, the touch panel, for example, is assembled on or integrated with a display apparatus such as a liquid crystal display apparatus, an OLED display apparatus, etc., so as to be used as a touch display apparatus with a touch detection function.

The touch panel may be provided with a touch sensor, for example, a projection capacitive touch sensor. The touch sensor may be implemented as being in a mutual-capacitance or self-capacitance sensing operation mode. In a mutual-capacitance implementation or operation mode, the touch sensor may include an array of driving and sensing electrodes that form an array of capacitive nodes. An overlapping region of a driving electrode and a sensing electrode may form a capacitive node, and the driving electrode and the sensing electrode may be coupled with each other in a capacitive manner across space therebetween. A driving signal applied to a driving electrode (TX) by a touch control circuit (a control circuit configured for touch detection) may induce charges on the sensing electrodes based on the coupled mutual-capacitance, and the amount of induced charges may be easily affected by external influence (e.g., touch or approach of an object).

The touch control circuit provides touch sensing signals to a processing apparatus (e.g., a CPU, etc.) by measuring a capacitance change of the entire mutual-capacitance array formed by the driving electrodes and the sensing electrodes, for the processing apparatus to determine a position or proximity of touch within a touch sensitive region of the touch sensor. In a case of a touch display apparatus or a touch display apparatus with a fingerprint recognition function, the processing apparatus may also interact with a display driving circuit and/or a fingerprint recognition control circuit, to control a display operation and a fingerprint recognition operation.

With respect to the touch detection process for the touch panel, it is always the objective of the industry that low noise and low power consumption are achieved as much as possible so as to improve detection accuracy and reduce power consumption costs.

SUMMARY

The present disclosure is intended to provide a touch driving apparatus and a touch driving method, so as to achieve the objective of low noise and low power consumption in the touch detection process.

According to an aspect of present application, a touch driving apparatus used for a touch sensor is provided. The touch sensor comprises a plurality of driving electrodes and a plurality of sensing electrodes intersecting with each other, and the touch driving apparatus comprises: at least one output module, each output module comprising at least two output stage circuits, each output stage circuit having an output terminal configured to output a driving signal to a connected driving electrode; a controller, configured to: for each output module, determine a first output stage circuit group and a second output stage circuit group in the current driving time period according to a Code Division Multiple Access (CDM) code matrix, wherein, a first driving signal group at an output terminal of the first output stage circuit group is expected to discharge a first driving electrode group, and a second driving signal group at an output terminal of the second output stage circuit group is expected to charge a second driving electrode group; and control utilizing power from the first driving electrode group to charge the second driving electrode group, in response to the determination.

According to another aspect of present application, a touch control apparatus used for a touch sensor is provided A touch control apparatus, comprising: a touch panel, comprising a touch sensor comprising a plurality of driving electrodes and a plurality of sensing electrodes intersecting with each other; the touch driving apparatus as described above, wherein, the touch driving apparatus is configured to supply driving signals to the plurality of driving electrodes on the touch panel.

According to another aspect of present application, a touch driving method used for a touch sensor is provided. The touch sensor comprises a plurality of driving electrodes and a plurality of sensing electrodes intersecting with each other; the plurality of driving electrodes are divided into at least one group; each group corresponds to an output module; and each output module comprises output stage circuits whose number is equal to that of driving electrodes of each group. The method comprises: for each output module, determining a first output stage circuit group and a second output stage circuit group in the current driving time period according to a Code Division Multiple Access (CDM) code matrix, wherein, a first driving signal group at an output terminal of the first output stage circuit group is expected to discharge a first driving electrode group, and a second driving signal group at an output terminal of the second output stage circuit group is expected to charge a second driving electrode group; and controlling utilizing power from the first driving electrode group to charge the second driving electrode group, in response to the determination.

Based on the touch driving apparatus, the touch control apparatus and the touch driving method as described in the present disclosure, by modularizing a plurality of output stage circuits corresponding to a plurality of driving electrodes on a touch panel, driving signals may be generated and controlled for each output module; secondly, in a process of generating the driving signals in a code division multiple access mode, a path switch(es) between driving electrodes is provided by taking advantage of a characteristics that driving signals may have energy interaction with each other, so that a charge-discharge process between the driving electrodes may be performed, and thus the power that the touch driving apparatus needs to supply to the driving electrodes may also be reduced while improving detection accuracy and reducing interference by adopting the code division multiple access, and thus, power consumption may be reduced.

BRIEF DESCRIPTION OF THE DRAWINGS

FIG. 8 to FIG. 13 shows schematic structures of a touch driving apparatus including a comparing unit(s) according to an embodiment of the present disclosure.

FIG. 14 shows a schematic flow chart of a method of a touch driving apparatus used for a touch panel according to an embodiment of the present disclosure.

DETAILED DESCRIPTION

In order to make objectives, technical details and advantages of the embodiments of the present disclosure apparent, the technical solutions of the embodiment will be described in a clearly and fully understandable way in connection with the drawings related to the embodiments of the present disclosure. It is obvious that the described embodiments are just a part but not all of the embodiments of the present disclosure. Based on the described embodiments herein, other embodiment(s) which can be acquired by those ordinarily skilled in the art without any inventive labor should be within the scope of the present disclosure.

Unless otherwise defined, the technical or scientific terms used in the present disclosure shall have the usual meanings understood by persons of ordinary skill in the field to which the present disclosure belongs. The terms "first", "second" and similar words used in the present disclosure do not indicate any order, quantity or importance, but are only used to distinguish different components. Similarly, words such as "one", "a/an" or "the" or the like do not denote quantitative limitation, but rather indicate that there is at least one. Words such as "include" or "comprise" and/or the like denote that elements or objects appearing before the words of "include" or "comprise" cover the elements or the objects enumerated after the words of "include" or "comprise" or equivalents thereof, not exclusive of other elements or objects. Words such as "connect to" or "connect with" and/or the like are not limited to physical or mechanical connections, but may include electrical connection, either direct or indirect. Words such as "up", "down", "left", "right" and/or the like are only used for expressing relative positional relationship, when the absolute position of the described object is changed, the relative positional relationship may also be correspondingly changed.

Figure 1:
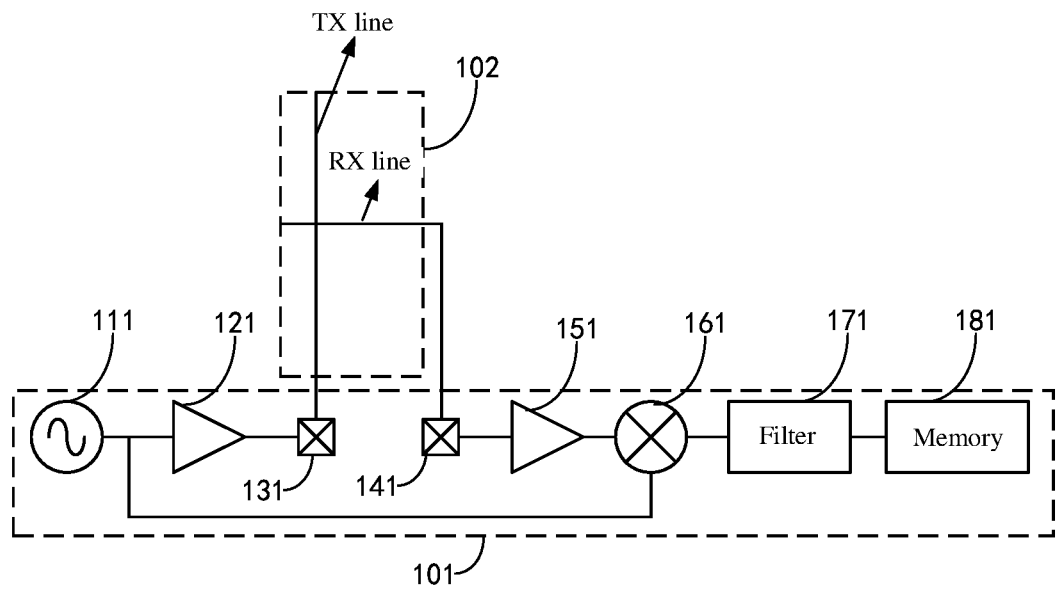
FIG. 1 shows a structural schematic diagram of a touch control apparatus according to an embodiment of the present disclosure.

FIG. 1 shows a structural schematic diagram of a touch control apparatus according to an embodiment of the present disclosure.

As shown in FIG. 1, the touch control apparatus 100 includes a touch control circuit 101 and a touch sensor 102.

The touch control circuit 101 includes a signal generator 111, a driver 121, a flexible circuit board pad 131, a flexible circuit board pad 141, an amplifier 151, a multi-selector 161, a filter 171, a memory 181, etc.

The touch sensor 102 includes a plurality of TX lines (driving electrodes) and a plurality of RX lines (sensing electrodes). A capacitor will be formed at an intersection of a TX line and an RX line, that is, the TX line and the RX line respectively form two electrodes of the capacitor. The driver 121 is electrically connected with the TX line through the flexible circuit board pad 131, to transmit a driving signal to the TX line. The driving signal may be, for example, a noiseless carrier signal of a predetermined frequency. After the driver 121 transmits the driving signal to the TX line, for example, the same carrier signal may be used to amplify and demodulate a signal from the RX line through the amplifier 151, the multi-selector 161, and the filter 171.

The touch control circuit may apply driving signals to the plurality of driving electrodes of the touch sensor, receive touch sensing signals from the plurality of sensing electrodes of the touch sensor, process the received touch sensing signals, and supply the same to a processing apparatus (e.g., a processor, a MCU, a DSP, an ASIC or a combination thereof, etc.), so that the processing apparatus may determine a position of a finger or other object, etc. that contacts or approaches the touch sensor. The touch control circuit may be integrated into one chip. In addition, in a case of a touch display apparatus or a touch display apparatus with a fingerprint recognition function, the processing apparatus may also interact with a display driver circuit and/or a fingerprint recognition control circuit, to control a display operation and a fingerprint recognition operation. Meanwhile, at least a portion of the touch control circuit, the display driver circuit and/or the fingerprint recognition control circuit may be integrated into one chip, for example, a Touch and Display Driver Integration (TDDI) chip and a Fingerprint Touch Display Integration (FTDI) chip.

The touch control apparatus 100 may include various electronic devices having a touch function (or may also include a display function and/or a fingerprint recognition function, etc.), for example, but not limited to, a mobile phone, a tablet personal computer, a personal digital assistant, a wearable device, and so on.

Figure 2A:
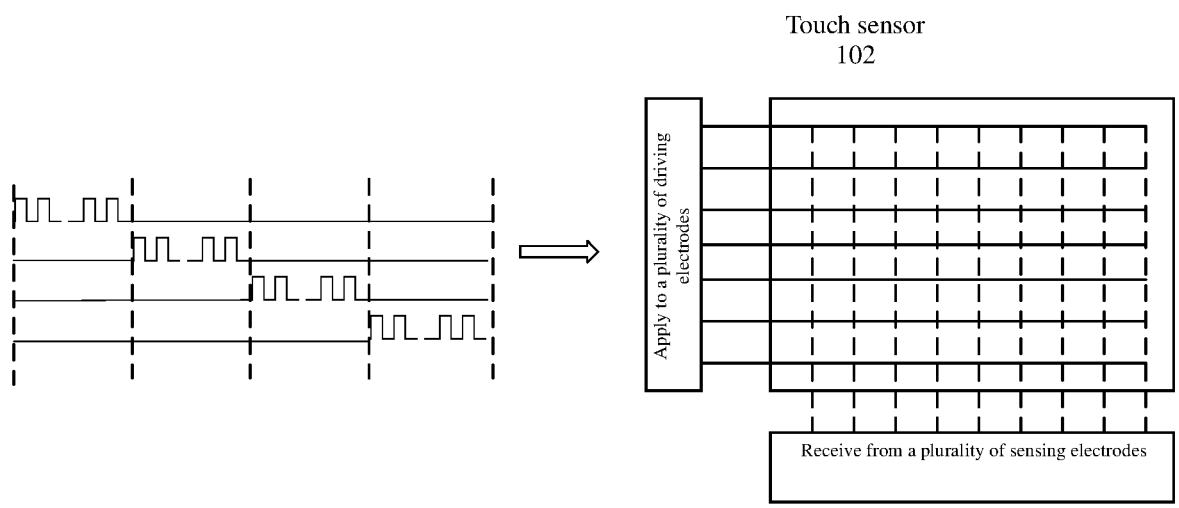
FIG. 2A shows an exemplary touch sensor in combination with Time Division Multiplexing (TDM) according to an embodiment of the present disclosure.
Figure 2B:
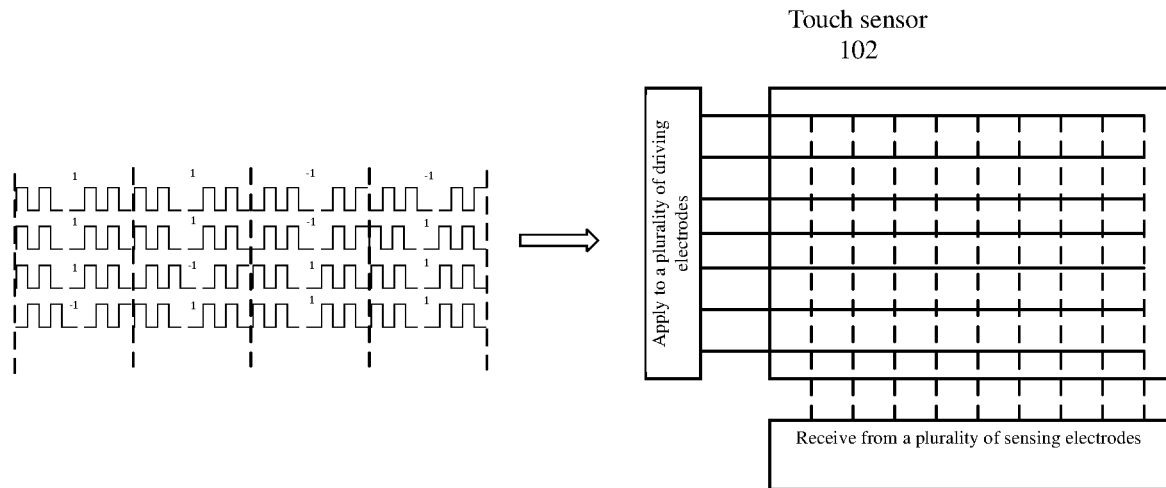
FIG. 2B shows an exemplary touch sensor in combination with Code Division Multiplexing (CDM) according to an embodiment of the present disclosure.
Figure 2C:
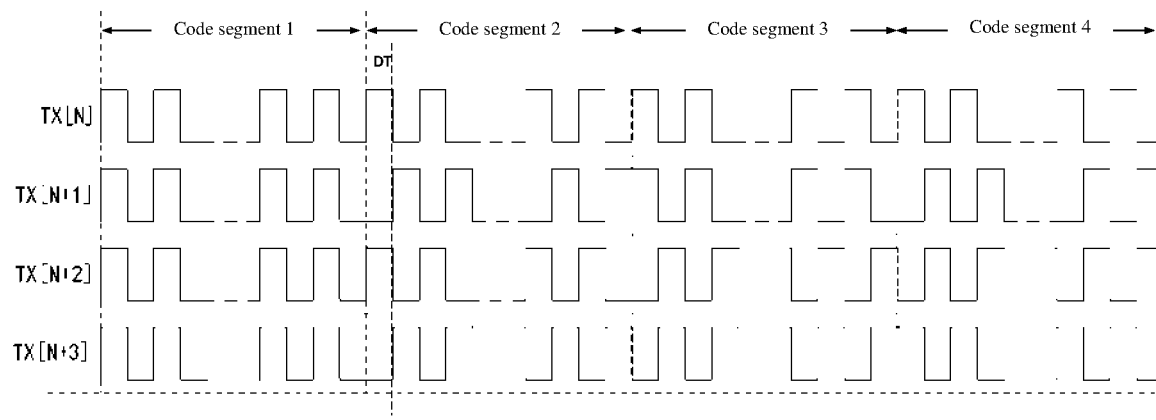
FIG. 2C illustrates a schematic diagram of a driving waveform corresponding to a Hadamard code matrix.

FIG. 2A illustrates an exemplary touch sensor in combination with Time Division Multiplexing (TDM) according to an embodiment of the present disclosure. FIG. 2B illustrates an exemplary touch sensor in combination with Code Division Multiplexing (CDM) according to an embodiment of the present disclosure. FIG. 2C illustrates a schematic diagram of a driving waveform corresponding to a Hadamard code matrix.

A Time Division Multiplexing (TDM) solution may be adopted when measuring mutual capacitances at respective intersections during touch detection process, that is, the driving electrodes are sequentially scanned with a preset noiseless driving signal (e.g., a carrier signal) at different times, and electrical signals are read(sensed) from all sensing electrodes at each time (e.g., then amplifying and demodulating with a same carrier signal). However, such a solution may lead to a long sensing time, because it is necessary to read the electrical signals from all sensing electrodes with respect to each driving electrode in a time-sharing manner. In addition, the touch sensor design using the TDM solution cannot fully solve the problem of occurrence of noise signals on the sensing electrodes that may be attributed to environment or other types of interference, which may cause a low Signal-to-Noise Ratio (SNR) of the sensed electrical signals.

As an improvement on Time Division Multiplexing (TDM), Code Division Multiplexing (CDM) may be adopted. In the CDM solution, a group of driving electrodes may be selected simultaneously, and a driving signal groups corresponding to a preset CDM code matrix (a matrix size is determined by the number of driving electrodes in each group) may be provided. For example, a reference driving signal may be coded with a preset code matrix, to obtain the driving signals corresponding to the preset CDM code matrix used for the group of driving electrodes; then, result codes obtained for all the sensing electrodes are demodulated, for example, the result codes are demodulated by multiplying the result codes with an inverse matrix of the preset CDM code matrix, so that a value of the mutual capacitance at the intersection of each driving electrode and each sensing electrode may be obtained, to further determine whether there is a change.

For example, the preset CDM code matrix which is a Hadamard code matrix of 4×4 encoding the reference driving signal to obtain the driving signals for four driving electrodes is taken as an example, and in the Hadamard code matrix, an inner product of any different rows (columns) is 0. The Hadamard code of 4×4 may be expressed as follows:

$$\begin{bmatrix} 1 & 1 & 1 & 1 \\ 1 & -1 & 1 & -1 \\ 1 & 1 & -1 & -1 \\ 1 & -1 & -1 & 1 \end{bmatrix}$$

Accordingly, a driving waveform corresponding to the Hadamard code matrix may be as shown in FIG. 2C.

In FIG. 2C, a horizontal direction is a time axis direction, and four driving signals are applied simultaneously to the driving electrodes TX[N], TX[N+1], TX[N+2] and TX[N+3]. Each code value in the code matrix corresponds to a waveform of a driving signal applied in a code segment (having a preset duration). For example, when the code value is 1, the waveform of the applied driving signal (within a code segment) is the same as a waveform of the reference driving signal; when the code value is −1, the waveform of the applied driving signal (within a code segment) is a waveform that lags 180° behind the reference driving signal.

Of course, the Hadamard code matrix is only an example of encoding and obtaining the driving signals; other codes may also be used for encoding the reference driving signal, and a dimension of the matrix may also be selected as needed. For example, a proprietary code matrix may be used. The proprietary code matrix includes codes that may balance a sum of code values 1 and −1 for each driving electrode in each code segment, which is close to zero (the so-called DC balance codes), which may reduce coupling noises entering the display panel due to a path formed by the parasitic capacitance between the driving electrode and a display electrode in the display panel (e.g., a gate, a data line, and/or a common electrode), and thus may reduce visual artifacts and improve display quality. Of course, the Hadamard code matrix may also reduce the sum of the code values 1 and −1 for each driving electrode in each code segment to a certain extent, which may also reduce the noises and improve the display quality.

In addition, the CDM solution is used, for example, for distributing multiplexed driving signals into many frequencies by encoding, which may avoid intra-band interference between a driving-sensing electrode pair (a driving electrode and all sensing electrodes are referred to as a driving-sensing pair), so that the signal-to-noise ratio of the sensed signals of the touch sensor may also be increased.

In some cases, the touch control circuit adopts a square wave signal as the driving signal, as shown in FIG. 2C. Of course, the driving signal may also include a triangle wave signal, a sine wave signal or other signal with a different type.

In addition, a power supply of the touch control circuit usually has a low voltage value. For example, with respect to a case where the touch control apparatus is a mobile phone whose battery may only supply a voltage signal of an amplitude of about 3.3 V, but an amplitude of the driving signal may be, for example, 6 V, so a boost circuit needs to be provided in the touch control circuit to boost the voltage signal, so as to obtain the amplitude required by the driving signal.

In a case of using the CDM solution, when driving signals are applied to the driving electrodes, and when each driving signal charges mutual capacitors on the corresponding driving electrode in the touch sensor, a current supplied to the touch sensor may be approximately an expression shown in Equation 1, and it is assumed in the expression that each driving electrode is fully charged by the applied driving signal.

$$I = N \times C_{TX} \times F \times V \quad (1)$$

where, I is an average value of the current supplied to the driving electrodes from the touch control circuit, N is the number of driving electrodes, $C_{TX}$ is total capacitance of mutual capacitors on each driving electrode, F is a carrier frequency for measurement, and V is an amplitude of the driving signal.

In a typical case, N=17, $C_{TX}$=500 pF, F=180 kHz, V=6 V; so it may be derived that I=17×500 pF×180 kHz×6V=9 mA.

In addition, measurement for capacitance of mutual capacitors is usually carried out at 120 Hz, and each scanning duration is 2 ms, so a total duty cycle is 24%. Besides, the boost circuit and other related circuits may usually operate at 90% efficiency, so driving power consumption of the touch control circuit may be calculated as follows:

$$\text{Power} = V \times I \times \text{Duty} \times (1 + (1 - \text{efficiency})) = 9 \text{ mA} \times 6 \\ V \times 24\% \times 110\% = 15 \text{ mW} \quad (2)$$

Such power consumption is quite obvious in a typical touch control circuit, thereby reducing efficiency of the touch control circuit during the touch detection operation.

Therefore, the present disclosure proposes a solution that can reduce power consumption of the touch control circuit when performing the touch detection operation, thereby improving efficiency.

Figure 3:
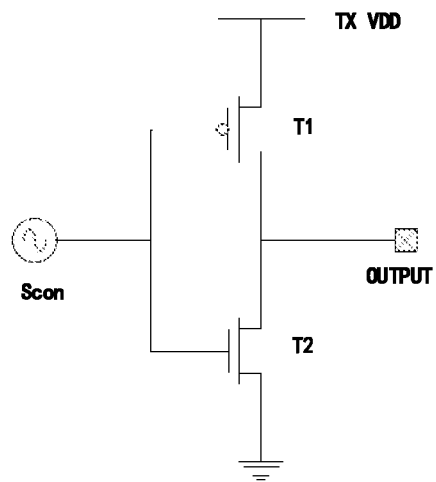
FIG. 3 shows a schematic diagram of an output stage circuit according to an embodiment of the present disclosure.

Firstly, an output stage circuit for the driving signals in the touch control circuit is briefly introduced. FIG. 3 shows a schematic diagram of an output stage circuit according to an embodiment of the present disclosure.

The output stage circuit may shape (e.g., generate a square wave driving signal) or improve, denoise, etc. for each driving control signal in the touch control circuit, so that a waveform of the driving signal meets design requirements. Optionally, the output stage circuit may be integrated into a same chip with the touch control circuit for touch detection, but may also be independent of the touch control circuit.

It should be understood that the output stage circuit shown in FIG. 3 is only an example, and may be other circuit that is capable of improving or shaping a waveform of the input driving control signal to obtain a driving signal. In addition, it should be noted that although most contents of the present disclosure have been illustrated by taking that a controller provides the driving signal to a corresponding driving electrode via the output stage circuit as an example, yet in some embodiments, the controller may directly provides the driving signal to a driving electrode without providing an output stage circuit.

As shown in FIG. 3, the output stage circuit may include a first switch and a second switch connected in series between a high-level power supply terminal(supplying a preset high level TX VDD, for example, 6V) and a low-level power supply terminal (e.g., providing a preset low level 0 V); and a connection node of the first switch and the second switch is connected to an output terminal of the output stage circuit.

Optionally, the output stage circuit includes a series branch of two transistors (T1 and T2) having opposite polarities. The first transistor T1 (e.g., a P-type transistor) on an upper side has a first terminal connected with a high-level power supply terminal (having a preset high level TX VDD, for example, 6 V), a second terminal connected with a first terminal of the second transistor T2 on a lower side, and a control terminal configured to receive a driving control signal. The second transistor T2 (e.g., an N-type transistor) on the lower side has a first terminal connected with the second terminal of the first transistor T1 on the upper side, a second terminal connected with the low-level power supply terminal (having a preset low level, for example, zero), and a control terminal also configured to receive the same driving control signal as the first transistor T1. A connection node of the first transistor T1 on the upper side and the second transistor T2 on the lower side is connected to the output terminal OUTPUT of the output stage circuit for outputting a driving signal applied to a corresponding driving electrode. Hereinafter, the "driving signal" as mentioned refers to the driving signal at the output terminal of the output stage circuit.

Of course, transistors T1 and T2 may also be other forms of transistors, and may be controlled by independent control signals, as long as they may be turned on and off to output the driving signal whose voltage value changes periodically between the preset high level and the preset low level. For example, T1 and T2 are transistors of a same type; a control signal for transistor T1 is the same as the driving control signal, and a control signal for transistor T2 is an inverse signal of the driving control signal.

Based on the circuit shown in FIG. 3, when the level of the driving control signal Scon exceeds a first threshold level, the transistor T2 is turned on, the transistor T1 is turned off, and an output at the output terminal OUTPUT is at the preset low level; when the level of the driving control signal Scon is lower than a second threshold level, the transistor T2 is turned off, the transistor T1 is turned on, and an output at the output terminal OUTPUT is at the preset high level, wherein, values of the first threshold level and the second threshold level are determined by parameters of the transistors (e.g., a threshold voltage Vth). Therefore, the amplitude of the driving signal TXdrv output from the output terminal OUTPUT changes between the preset high level and the preset low level, so signal quality is relatively good; and by setting the value of the preset high level, the output driving signal may be ensured to have sufficient driving capability.

Returning to power consumption calculation of the touch control circuit, power consumption calculated with reference to Equations (1) to (2) above is performed based on the current that a power supply (e.g., the high-level power supply end in FIG. 3) charges mutual capacitors on each driving electrode and the current that mutual capacitors on each driving electrode discharges to a reference terminal (e.g., the low level power supply terminal in FIG. 3).

Considering that in the CDM method, in each code segment, there may be inverse code values (e.g., 1 and −1), and corresponding driving signals may have phase shift, so an amplitude difference of at least two driving signals during each driving time period (e.g., half of a driving cycle) included in the code segment will be great enough, for example, with respect to the driving signal applied to the first driving electrode, a voltage value at the end of a previous driving time period is 6 V, and an expected voltage value in the current driving time period is 0 V, meanwhile, with respect to the driving signal applied to the second driving electrode, a voltage value at the end of a previous driving time period is 0 V, and an expected voltage value in the current driving time period is 6 V. Therefore, the driving signals applied to different driving electrodes in the current driving time period are expected to discharge mutual capacitors on the first driving electrode of the different driving electrodes, while charging the mutual capacitors on the second driving electrode of the different driving electrodes, at this time, the solution proposed in the present disclosure may utilize at least a portion of power released by the mutual capacitors on the first driving electrode to charge the mutual capacitors on the second driving electrode, which, thus, may reduce power absorbed from the touch control circuit (e.g., an internal power supply that supplies 6 V voltage), thereby reducing power consumption of the touch control circuit when performing the touch detection operation.

The touch driving apparatus and the touch driving method according to the embodiments of the present disclosure will be described in detail below in conjunction with FIG. 4 to FIG. 9.

Figure 4:
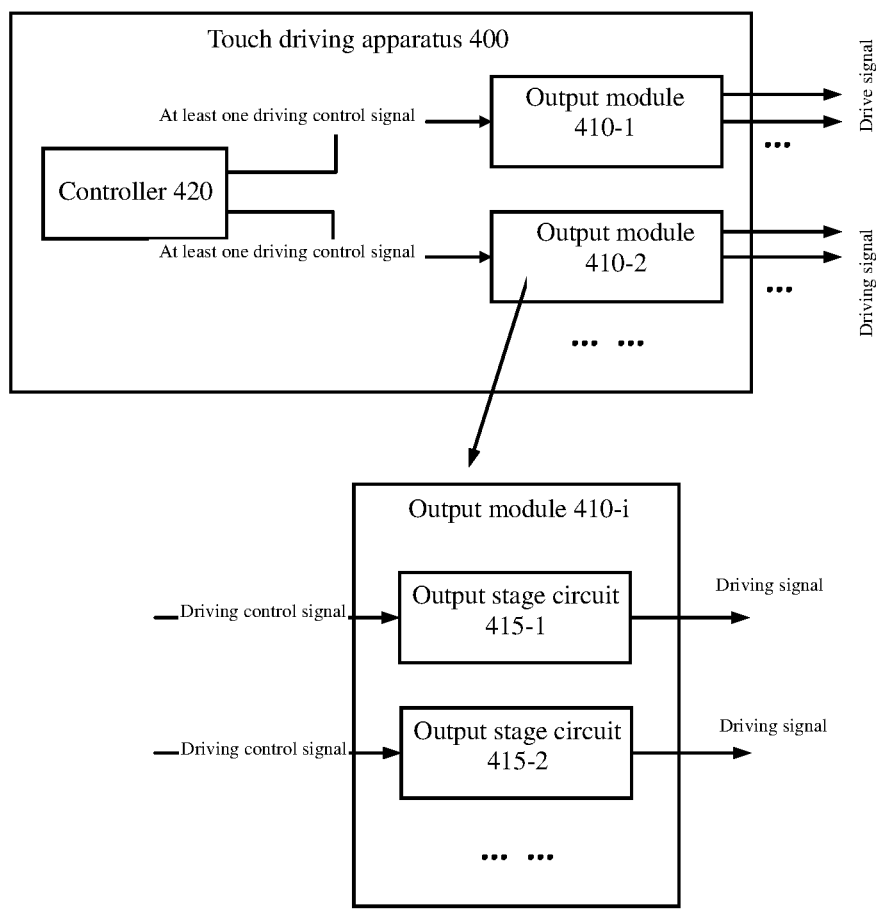
FIG. 4 shows a structural schematic diagram of a touch driving apparatus used for a touch panel according to an embodiment of the present disclosure.

FIG. 4 shows a structural schematic diagram of a touch driving apparatus used for a touch panel according to an embodiment of the present disclosure. Optionally, the touch driving apparatus may be the touch control circuit as shown in FIG. 1 or included in the touch control circuit as shown in FIG. 1. The touch panel includes a touch sensor comprising a plurality of driving electrodes and a plurality of sensing electrodes vertically intersecting with each other; and a mutual capacitor is formed at each intersection of the plurality of driving electrodes and the plurality of sensing electrodes.

According to some embodiments, the touch driving apparatus may include a controller.

The controller may determine a first driving electrode group and a second driving electrode group in the current driving time period according to a Code Division Multiple Access (CDM) code matrix, wherein, the first driving electrode group includes one or more driving electrode(s) among the plurality of driving electrodes that are expected to be discharged in the current driving time period, and the second driving electrode group includes one or more driving electrode(s) among the plurality of driving electrodes that are expected to be charged in the current driving time period; and the controller may control utilizing power from the first driving electrode group to charge the second driving electrode group, in response to the determination.

For example, during a period when the first driving electrode group charges the second driving electrode group, the controller may not control to supply any signal to the first driving electrode group and the second driving electrode group; and the controller may control to supply a low voltage to the first driving electrode group, for the first driving electrode group to release remaining power thereof after charging is completed, and supply a high level to the second driving electrode group, for the second driving electrode group to continue charging.

Optionally, between the first driving electrode group and the second driving electrode group, there is a charge-discharge path(s) under control of the controller.

Optionally, the touch driving apparatus may be modularized. In this way, the plurality of driving electrodes are divided into a plurality of groups, and the controller applies a same Code Division Multiple Access (CDM) code matrix to a control signal generated for each group.

According to some other embodiments, as described above, in order to better shape and improve the driving signal, and reduce requirements for the controller function, an output stage circuit may be introduced, and each output stage circuit has an input terminal configured to receive the driving control signal from the controller, and an output terminal configured to output the driving signal to the connected driving electrode.

It should be understood that settings related to the output terminal of the output stage circuit hereinafter are also applicable to the output terminal of the controller connected to the driving electrode without including the output stage circuit, for example, a path switch(s) is connected between the output terminals of the controller, and/or a path switch(s) connected to the terminals of the controller is connected to the charge sharing bus, etc.

As shown in FIG. 4, the touch driving apparatus 400 may include: at least one output module 410 and a controller 420.

The at least one output module 410 refers to modules (e.g., circuits) 410-1, 410-2, . . . obtained by modularizing a plurality of output stage circuits configured to supply driving signals to the plurality of driving electrodes. Each output module is connected to a driving electrode group on the touch panel, and the number of the driving electrode groups is equal to the number of output stage circuits included in the output module.

For example, each output module includes at least two output stage circuits 415-1, 415-2, . . . and an output terminal OUTPUT of each output stage circuit is configured to output a driving signal to a connected driving electrode. Of course, modularization may not be performed, and at this time, all output stage circuits may be regarded as one output module.

Optionally, a structure of each output stage circuit 415-1, 415-2, . . . may be of the structure of the output stage circuit as described above with reference to FIG. 3. Based on the input driving control signal, a square wave signal switched between the preset high level TX VDD and the preset low level may be obtained, as the driving signal supplied to the driving electrode. The number of driving control signals input to each output stage circuit may be one or more according to circuit structures and device parameters of the output stage circuit.

The controller 420 may be configured to perform a same or similar operation for each output module. For example, for each output module, the controller 420 may determine a first output stage circuit group and a second output stage circuit group in the current driving time period according to the Code Division Multiple Access (CDM) code matrix, wherein, a first driving signal group at the output terminal(s) of the first output stage circuit group is expected to discharge the first driving electrode group, and a second driving signal group at the output terminals of the second output stage circuit group is expected to charge the second driving electrode group; and may control utilizing power from the first driving electrode group to charge the second driving electrode group, in response to the determination.

For example, the CDM code matrix may be a matrix adopted when using the CDM method to generate driving signals simultaneously applied to respective driving electrodes, as described above with reference to FIG. 2B to FIG. 2C. The controller may acquire the preset CDM code matrix from the outside or read the preset CDM code matrix locally, and may determine timings of driving signals expected to be applied to each driving electrode in the current driving time period according to the CDM code matrix, so that the first output stage circuit group and the second output stage circuit group in the current driving time period may be determined, wherein, the first driving signal group at the output terminal(s) of the first output stage circuit group is expected to discharge the first driving electrode group, and the second driving signal group at the output terminal(s) of the second output stage circuit group is expected to charge the second driving electrode group. According to the CDM code matrix, the first output stage circuit group and the second output stage circuit group may each include one or more output stage circuits. However, according to the CDM code matrix, during a period corresponding to a certain code segment, for example, during a period corresponding to a first code segment in FIG. 2C, driving signals applied to respective driving electrodes are synchronous (e.g., corresponding code values are all 1 or −1), at this time, there is only the first output stage circuit group or the second output stage circuit group, so there is no charge-discharge process between the driving electrodes as described later.

For example, the controller may firstly determine a timing of a driving signal corresponding to each driving electrode according to the CDM code matrix, wherein, each driving signal includes a plurality of driving time periods, and a duration of each driving time period is half of the cycle of the driving signal, as shown in FIG. 2C, a DT period is a driving time period; then, for each driving time period, the controller further determines the first output stage circuit group and the second output stage circuit group based on the determined timing of the driving signal corresponding to each driving electrode, and also controls each output stage circuit based on a voltage value at an output terminal of each output stage circuit in the current driving time period (real-time, which will change with the charge-discharge process), for example, as described later, controls ON and OFF of the switches in the output stage circuits and ON and OFF of the path switch(es) between the output stage circuits, to replace the charge-discharge process between the driving electrodes at an appropriate time, so as to charge the driving electrode(s) via a high-level power supply terminal and/or cause the driving electrode(s) to discharge to the low-level power supply terminal.

Optionally, the controller 420 may control utilizing the power from the first driving electrode group to charge the second driving electrode group up to the first time period when controlling the charge-discharge process between the driving electrodes, and after the first time period, control releasing remaining power from the first driving electrode group to the low-level power supply terminal, and utilizing the high-level power supply terminal to continue to charge the second driving electrode group.

For example, when the output stage circuit adopts the circuit structure as described in FIG. 3, that is, each output stage circuit includes a first switch T1 and a second switch T2 connected in series between the high-level power supply terminal and the low-level power supply terminal, a connection node of the first switch T1 and the second switch T2 is connected to the output terminal of the output stage circuit; the controller may turn on the first switch of each output stage circuit and turn off the second switch, to utilize the high-level power supply terminal to charge the driving electrode connected with the output terminal of the output stage circuit; and turn on the second switch of each output stage circuit and turn off the first switch to release the remaining power from the driving electrode connected with the output terminal of the output stage circuit to the low-level power supply terminal (e.g., after an end of the charge-discharge process between the driving electrodes, that is, after the first time period). In addition, the controller turns off both the first switch and the second switch included in each output stage circuit while controlling the charge-discharge process between the driving electrodes (e.g., during the first time period).

That is to say, the power from the first driving electrode group may only supply a portion of the power needed to charge the second driving electrode group to the preset high level (e.g., TX VDD). For example, when voltages of these driving electrodes are equal or balanced after the charge-discharge process of the first time period, or when it is determined that the charge-discharge process between the driving electrodes should be stopped according to other conditions (e.g., the current driving time period has started for a preset duration), there should be no or no more current flow between the driving electrodes, but at this time, the second driving electrode group has not been fully charged (i.e., the voltage(s) thereon has not been charged to the preset high level), and the voltage(s) on the first driving electrode group has not been released to the preset low level (e.g., 0), so, additional power supply is required to continue charging the second driving electrode group, and the remaining power on the first driving electrode group needs to be released.

Optionally, the controller may include various processing apparatuses capable of implementing the above-described control functions (e.g., including but not limited to a CPU, a DSP, a FPGA, an ASIC, a MCU, etc.), and may also include storage apparatuses (e.g., including but not limited to a memory such as RAM, ROM, etc., cache, or other types of storage apparatuses) for storing instructions, programs, information or data, etc. required for implementing the above-described control or determination process. The controller may also include other circuits, components, firmware, etc. In addition, the controller may be implemented by hardware circuits, software or a combination thereof.

By referring to the touch driving apparatus 400 as described in FIG. 4, a driving electrode that needs to release power may be utilized to charge a driving electrode that needs to be charged; the touch driving apparatus may supply power to the driving electrode that needs to be charged after the charge-discharge process has been started for a period of time, so power that needs to be supplied to the driving electrode by the touch driving apparatus may be reduced, which may reduce power consumption of the touch driving apparatus.

Figure 5:
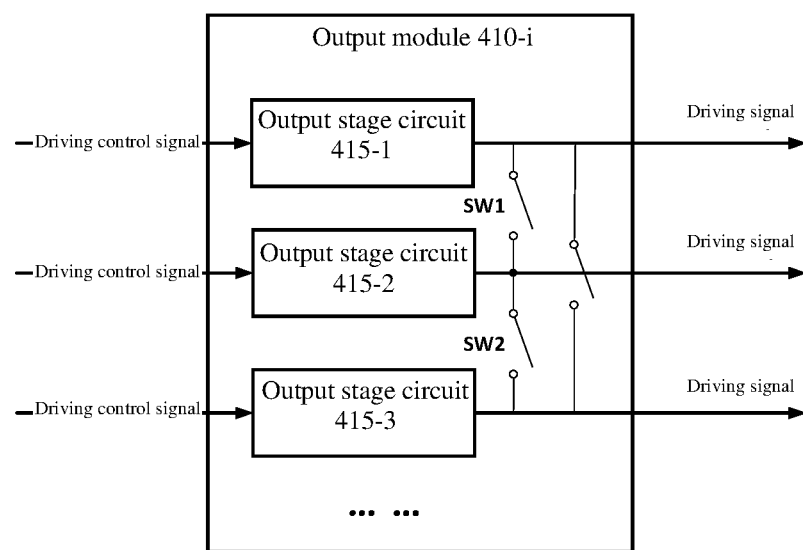
FIG. 5 shows a structural schematic diagram of another touch driving apparatus used for a touch panel according to an embodiment of the present disclosure.

As further illustration of the touch driving apparatus described in FIG. 4, FIG. 5 shows a structural schematic diagram of another touch driving apparatus used for a touch panel according to an embodiment of the present disclosure.

As shown in FIG. 5, the touch driving apparatus 400 may further include at least one path switch SW1, SW2 . . . , which is arranged between output terminals of every two output stage circuits among the at least two output stage circuits in each output module, for providing a charge-discharge path(s) between the driving electrodes. Although not shown, the at least one path switch may also be a switch between each output terminal and a charge sharing bus to be described later. Optionally, the path switch(es) may be provided in respective output modules (as shown in FIG. 6A), or independent of the output modules (as shown in FIG. 6B).

As described above, in each driving time period, whether a driving signal output by each output stage circuit is to charge or discharge the connected driving electrode may be determined according to the CDM code matrix, so a driving electrode connected with each output stage electrode circuit may be a driving electrode not to be discharged or charged by another driving electrode (e.g., the code values are the same), or may be a driving electrode to be charged by another driving electrode located in the output module or a driving electrode to release power to another driving electrode in the output module. Therefore, the path switch(es) may be required between output terminals of every two output stage circuits among the at least two output stage circuits in each output module, so that when a charge-discharge process between driving electrodes is required, the path switch(es) may provide one or more corresponding charge-discharge paths under control of the controller.

For example, in combination with the structure of the output stage circuit, during the first time period (the time period when power from the first driving electrode group is utilized to charge the second driving electrode group), the controller disables the first output stage circuit group and the second output stage circuit group, and controls turning on at least part of path switches, so that the power from the first driving electrode group charges the second driving electrode group; and after the first time period, the controller enables an conductive path between the output terminals of the first output stage circuit group and the low-level power supply terminal as well as an conductive path between the high-level power supply terminal and the output terminals of the second output stage circuit group, and controls turning off the at least part of path switches.

Figure 6A:
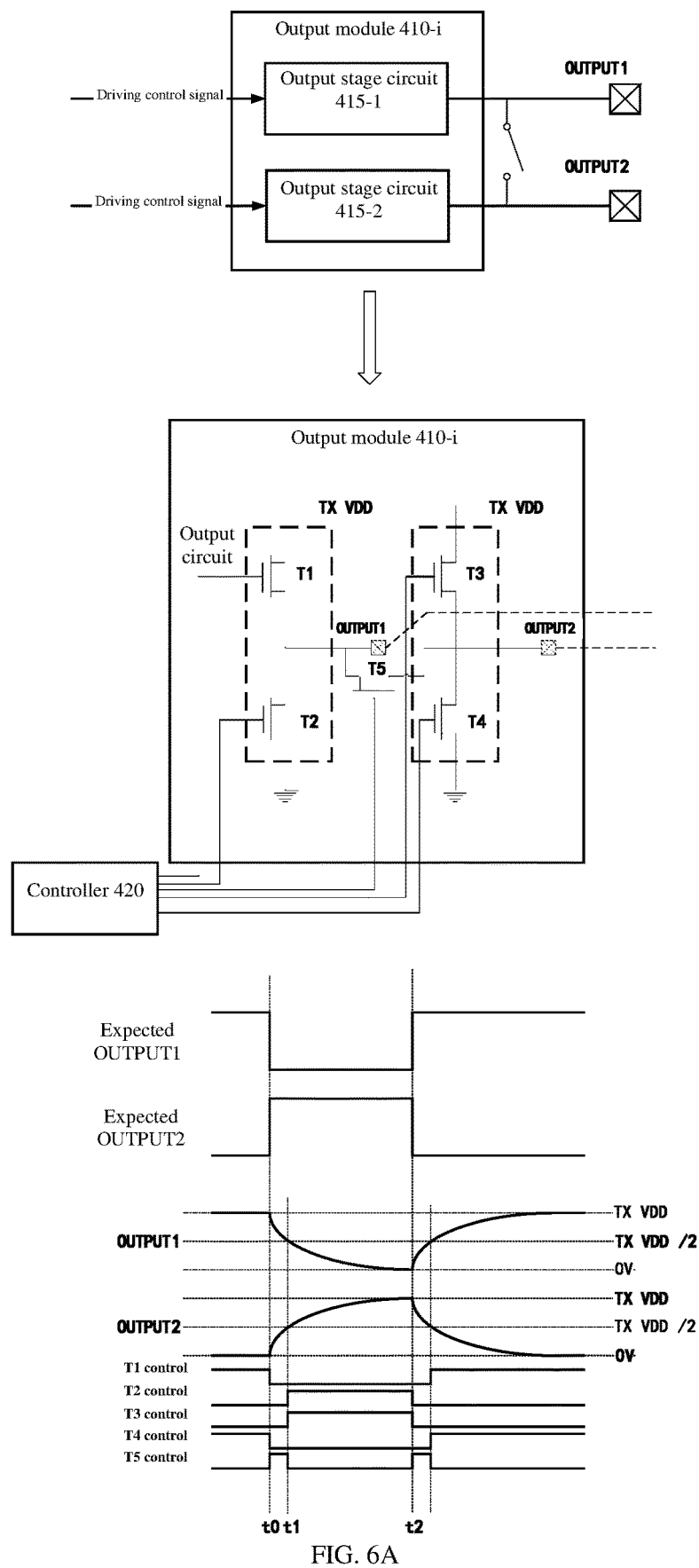
FIG. 6A to FIG. 6B show schematic diagrams of a charge-discharge path(s) arranged between every two output stage circuits according to an embodiment of the present disclosure.
Figure 6B:
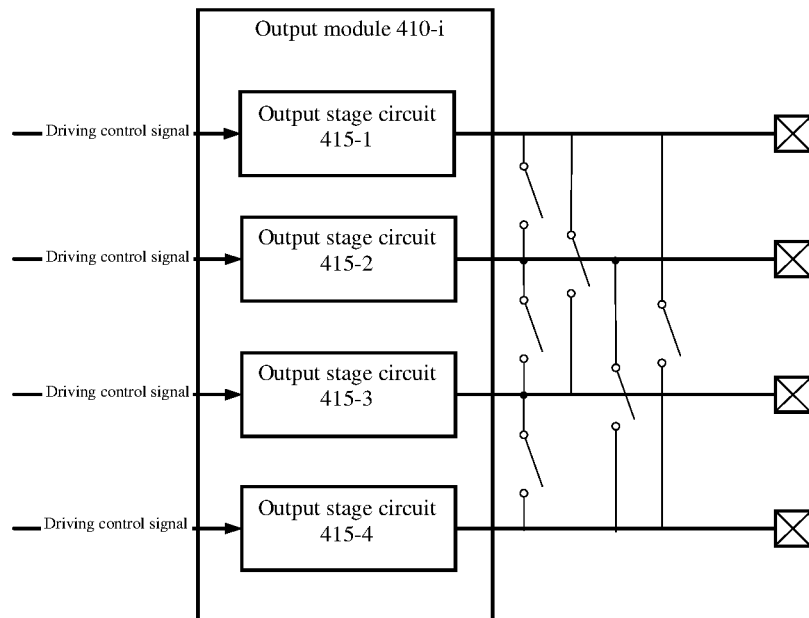

As an example, as shown in FIG. 6A, one output module includes two output stage circuits. Assuming that according to the CDM code matrix, it is determined that the first output stage circuit group in the current driving time period includes a first output stage circuit (including switches T1 and T2), and the second output stage circuit group includes a second output stage circuit (including switches T3 and T4), a path switch T5 is provided between output terminals of the first output stage circuit and the second output stage circuit. During the first time period, the controller controls turning on the path switch T5 (without turning on the switches in the first output stage circuit and the second output stage circuit), so that power from the first driving electrode connected with the first output stage circuit charges the second driving electrode connected with the second output stage circuit via the path switch T5; after the first time period, the controller controls turning off the path switch T5. Thereafter, the controller may control turning on the first switch T3 in the second output stage circuit, so that the second driving electrode may be supplied with a voltage of a preset high level to continue to be charged, and control turning on the second switch T2 of the first output stage circuit to connect the first driving electrode to the low-voltage power supply terminal having a preset low level, so that the first driving electrode may continue to be discharged.

At a same time, as an example, the operation process of the output module is briefly described in conjunction with a driving timing waveform in FIG. 6A.

Firstly, at time point t0, when entering the current driving time period, the controller determines according to the CDM code matrix that an expected voltage value of the first driving electrode changes to 0 from the preset high level of the previous driving time period, that is, it is expected to discharge the first driving electrode, meanwhile, an expected voltage value of the second driving electrode changes to the preset high level from 0 of the previous driving time period, that is, it is expected to charge the second driving electrode, so, the controller may determine to utilize the power on the first driving electrode to charge the second driving electrode, so, at this time, the controller controls turning on the path switch between the output terminals of the first output stage circuit and the second output stage circuit (e.g., the high level is considered as an active level in the diagram), so that a current may flow from the output terminal of the first output stage circuit to the output terminal of the second output stage circuit, and turning off the switches in the first output stage circuit and the second output stage circuit, that is, no power interaction is performed with the driving electrodes through the first output stage circuit and the second output stage circuit at this time.

Starting from time point t0, switches T1 to T4 (which are assumed to have a same type and be turned on at the high level) in the first output stage circuit and the second output stage circuit are all turned off, and the path switch T5 is turned on, for example, the control signals for T1 to T4 shown in FIG. 6A are all at the low level, and the control signal for T5 is at the high level. Since the first driving electrode starts to charge the second driving electrode via the path switch turned on, a real-time voltage at the output terminal of the first output stage circuit (corresponding to a real-time voltage on the first driving electrode) starts to drop gradually, while a real-time voltage at the output terminal of the second output stage circuit (corresponding to a real-time voltage on the second driving electrode) starts to rise gradually.

At time point t1, the real-time voltage at the output terminal of the first output stage circuit drops to TX VDD/2, meanwhile, the real-time voltage at the output terminal of the second output stage circuit rises to TX VDD/2, that is, the voltages on the first driving electrode and the second driving electrode have reached equalization and the charge-discharge process can no longer continue, or a voltage difference between the two voltages has met a threshold condition (e.g., within a threshold range), so the first time period corresponding to the charge-discharge process ends, at this time, the path switch T5 is turned off, and the corresponding control signal for T5 becomes an inactive level (a low level), but the second driving electrode still needs to be charged and the first driving electrode still needs to be discharged. Therefore, the second switch T2 on the lower side of the first output stage circuit is turned on (the first switch T1 on the upper side remains OFF), so that the first driving electrode continues to be discharged to the low-level power supply terminal having the preset low level, and the first switch T3 on the upper side of the second output stage circuit is turned on (the second switch T4 on the lower side remains OFF) so that the second driving electrode continues to be charged by utilizing the preset high level of the high-level power supply terminal until the end of the current driving time period.

It should be noted that in FIG. 6A, it is illustrated by taking only two driving electrodes for the charge-discharge process as an example, so in this case, an ideal condition for charge-discharge equalization is voltages on the driving electrodes being TX VDD/2 (including a measurement error range). In addition, according to the number of driving electrodes for the charge-discharge process, the ideal conditions for charge-discharge equalization also vary. For example, when a ratio of the number of the driving electrodes to be discharged to the number of driving electrodes to be charged is 1:2, the ideal condition for the charge-discharge equalization is the voltages on the driving electrodes being TX VDD/3 (including a measurement error range). Meanwhile, different conditions may also be set to stop the charge-discharge process without ideal equalization. For example, the charge-discharge process will stop if the charge-discharge process has proceeded for a predetermined duration or if a voltage difference between voltages on two driving electrodes which are to be charged and to be discharged is less than TX VDD/10.

Thereafter, at time point t2, the current driving time period ends, and a next driving time period serves as a new current driving time period. At this time, the second driving electrode starts to be discharged, and the first driving electrode starts to be charged; then it is necessary to turn on the path switch in a direction reverse to that of path switch in the previous driving time period, to supply power from the second driving electrode to the first driving electrode. Driving timings of respective switches in the process are similar to the driving timings in the previous driving time period, and no details will be repeated here As another example, as shown in FIG. 6B, an output module includes four output stage circuits. For convenience of description, a specific structure of the output stage circuit is omitted. For example, the specific structure may be shown in FIG. 3 or be other available structure. In FIG. 6B, path switches are arranged between output terminals of every two output stage circuits.

A driving principle of the output module shown in FIG. 6B is similar to the driving principle of the output module shown in FIG. 6A. Assuming that according to the CDM code matrix, it is determined that the first output stage circuit group includes the first output stage circuit and the second output stage circuit, and the second output stage circuit group includes a third output stage circuit and a fourth output stage circuit. During the first time period, the controller controls turning on path switches between output terminals of the first output stage circuit and the third output stage circuit, between output terminals of the first output stage circuit and the fourth output stage circuit, between output terminals of the second output stage circuit and the third output stage circuit, and between output terminals of the second output stage circuit and the third output stage circuit, so that power from the first driving electrode and the second driving electrode connected with the first output stage circuit and the second output stage circuit charges a third driving electrode and a fourth driving electrodes connected with the third output stage circuit and the fourth output stage circuit; and after the first time period, the controller controls turning off these path switches, controls the first switch and the second switch in the first to the fourth output stage circuits, to supply a voltage of a preset high level to the third driving electrode and the fourth driving electrode, so that the third driving electrode and the fourth driving electrode continue to be charged, and controls connecting the first driving electrode and the second driving electrode to the low-voltage power supply terminal having a preset low level, so that the first driving electrode and the second driving electrode continue to be discharged.

Or, in such case, when the first output stage circuit group and the second output stage circuit group each include at least two output stage circuits, and path switches are provided between every two output stage circuits, the controller may determine which path switch(es) between output terminals of the output stage circuits will be turned on according to a preset rule, and may make the driving electrodes to be discharged be in one-to-one correspondence with the driving electrodes to be charged as far as possible, so as to simplify control logic, for example, according to position distances from each other among the driving electrodes connected with the output stage circuits, random combination, and/or equalizing the number of output stage circuits connected with the driving electrodes to be charged and the number of output stage circuits connected with the driving electrodes to be discharged as far as possible, and so on.

For example, the controller controls turning on the path switch between the output terminals of the first output stage circuit and the third output stage circuit, so that power from the first driving electrode connected with the first output stage circuit charges the third driving electrode connected with the third output stage circuit, controls turning on the path switch between the second output stage circuit and the fourth output stage circuit, so that power from the second driving electrode connected with the second output stage circuit charges the fourth driving electrode connected with the fourth output stage circuit; and after the first time period, the controller controls turning off these path switches, controls the first switch and the second switch in the respective output stage circuits to supply a voltage of the preset high level to the third driving electrode and the fourth driving electrode, so that the third driving electrode and the fourth driving electrode continue to be charged, and controls connecting the first driving electrode and the second driving electrode to the low-voltage power supply terminal having the preset low level, so that the first driving electrode and the second driving electrode continue to be discharged.

In addition, in a case of the output module shown in FIG. 6B, if in the current driving time period, driving signals output by the second output stage circuit and the third output stage circuit still need to maintain the same level as in the previous driving time period, and thus the first output stage circuit group only includes the fourth output stage circuit, and the second output stage circuit group only includes the first output stage circuit, the driving electrodes connected with the second output stage circuit and the third output stage circuit do not need to be charged by another driving electrode or be discharged to another driving electrode, so only the path switch from the output terminal of the fourth output stage circuit to the output terminal of the first output stage circuit is turned on.

Driving timings of switches and path switches in the output stage circuits as shown in FIG. 6B may also be deduced similarly according to the driving timings in FIG. 6A, as long as the charge-discharge process between driving electrodes is guaranteed in the first time period of the current driving time period.

As described above, in each output module, the path switch(es) is required between output terminals of every two output stage circuits, and each path switch is capable of providing a path for bidirectional current flow, so each of the path switches provided between output terminals of every two output stage circuits is a single bidirectional conduction switch (a single switch device) or a pair of unidirectional conduction switches (two switch devices) with reverse conduction directions. Optionally, each path switch may be a transistor of various types.

An exemplary embodiment of how to use the path switch(es) to provide the charge-discharge path(s) in the touch driving apparatus is described above with reference to FIG. 5 to FIG. 6B, and another exemplary embodiment of how to use the path switch(es) and use a charge sharing bus to provide the charge-discharge paths will be described below with reference to FIG. 7A to FIG. 7D.

As shown in FIG. 7A to FIG. 7D, the touch driving apparatus 400 may further include: at least one charge sharing bus; and an output terminal of each output stage circuit included in each output module is respectively connected to the at least one charge sharing bus via a corresponding path switch, that is, each output terminal is switchably connected to each charge sharing bus via at least one path switch. Each path switch is a single bidirectional conduction switch or a pair of unidirectional conduction switches with reverse conduction directions. Although an output terminal of each output stage circuit is connected to the charge sharing bus via a corresponding path switch, it can be still regarded as that there are path switches between output terminals of every two output stage circuits.

Figure 7A:
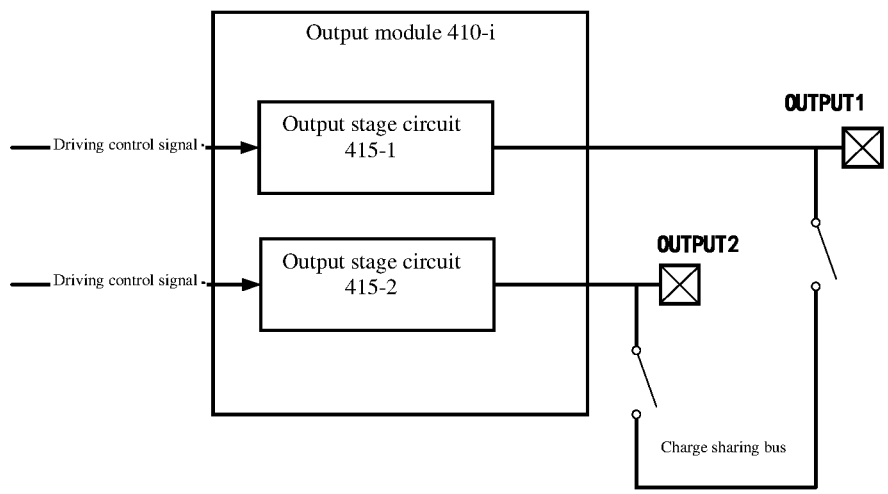
FIG. 7A to FIG. 7D show schematic diagrams of a charge-discharge path(s) between every two output stage circuits by adopting a charge sharing bus according to an embodiment of the present disclosure.

FIG. 7A shows an example in which there is one charge sharing bus, and there are two output stage circuits included in each output module; wherein, the output terminal OUTPUT1 of the first output stage circuit and the output terminal OUTPUT2 of the second output stage circuit are both connected to the charge sharing bus via a path switch (although shown as one path switch, it can represent a single bidirectional conduction switch or a pair of unidirectional conduction switches with reverse ON directions). When the first driving electrode connected with the output terminal OUTPUT1 of the first output stage circuit is expected to charge the second driving electrode connected with the output terminal OUTPUT2 of the second output stage circuit, the path switch corresponding to the first output stage circuit is turned on in the first direction, and the path switch corresponding to the second output stage circuit is turned on in the second direction (or it is also feasible to turn on these path switches in both directions simultaneously), so charging current will flow via the charge sharing bus, and vice versa.

Figure 7B:
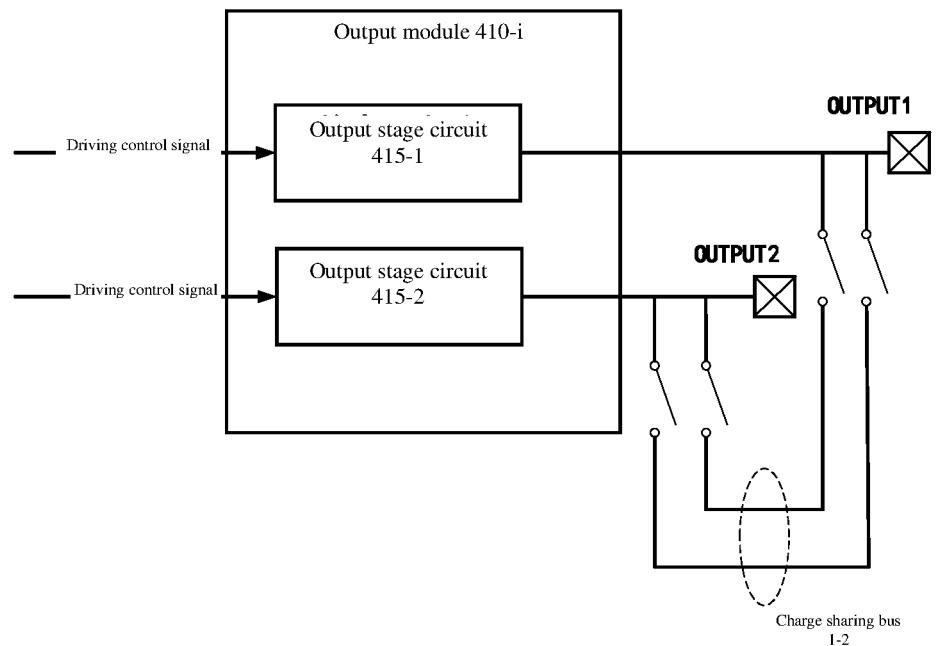

FIG. 7B shows an example in which there are two charge sharing buses (e.g., the greater the number of buses is, the lower the path loss and/or the faster the charge-discharge speed may be), and there are two output stage circuits included in each output module, wherein the output terminal OUTPUT1 of the first output stage circuit and the output terminal OUTPUT2 of the second output stage circuit are each connected to two charge sharing buses via two path switches. When the first driving electrode connected with the output terminal OUTPUT1 of the first output stage circuit is expected to charge the second driving electrode connected with the output terminal OUTPUT2 of the second output stage circuit, the two path switches corresponding to the first output stage circuit are turned on in the first direction, and the two path switches corresponding to the second output stage circuit are turned on in the second direction (or it is also feasible to turn on these path switches in both directions simultaneously), so that charging current will flow via these two charge sharing buses, and vice versa.

Figure 7C:
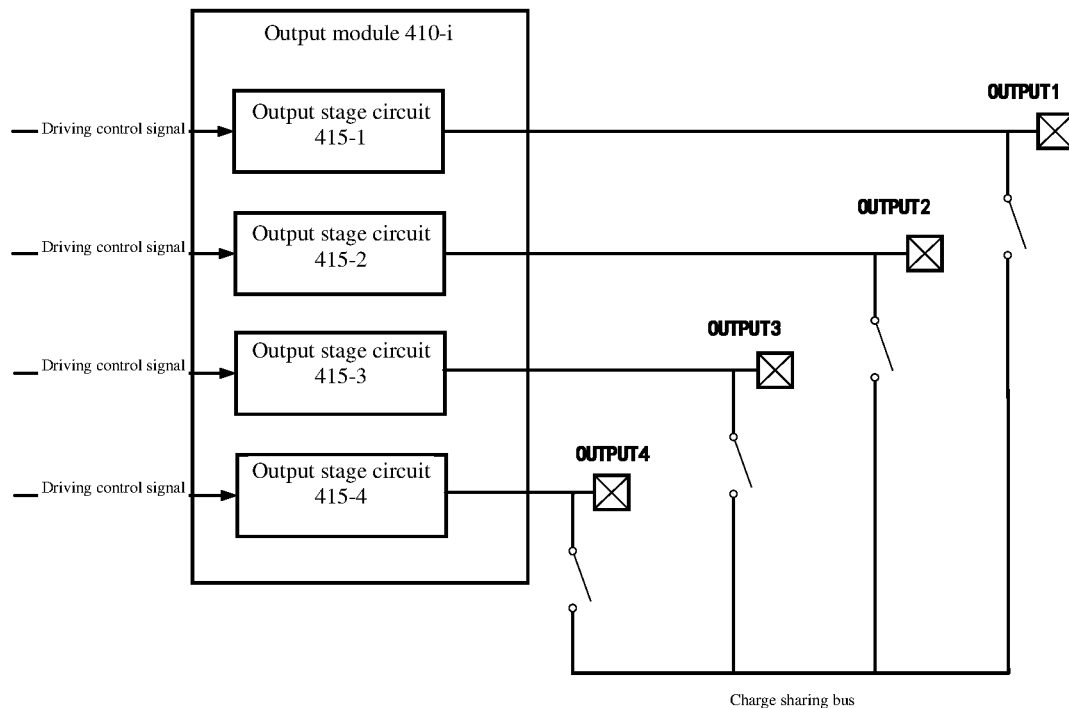

FIG. 7C shows an example in which there is one charge sharing bus, and there are four output stage circuits included in each output module, wherein, the output terminals OUTPUT1 to OUTPUT4 of the first output stage circuit to the fourth output stage circuit are each connected to the charge sharing bus via one path switch. When driving electrodes in the first driving electrode group connected with the output terminals of output stage circuits in the first output stage circuit group (e.g., the first output stage circuit and the second output stage circuit) are expected to charge driving electrodes in the second driving electrode group connected with the output terminals of output stage circuits in the second output stage circuit group(e.g., the third output stage circuit and the fourth output stage circuit), the path switches corresponding to the first output stage circuit and the second output stage circuit are turned on in the first direction, and the path switches corresponding to the third output stage circuit and the fourth output stage circuit are turned on in the second direction (or it is also feasible to turn on these path switches in both directions simultaneously), so that charging current flows via the charge sharing bus, and vice versa.

Figure 7D:
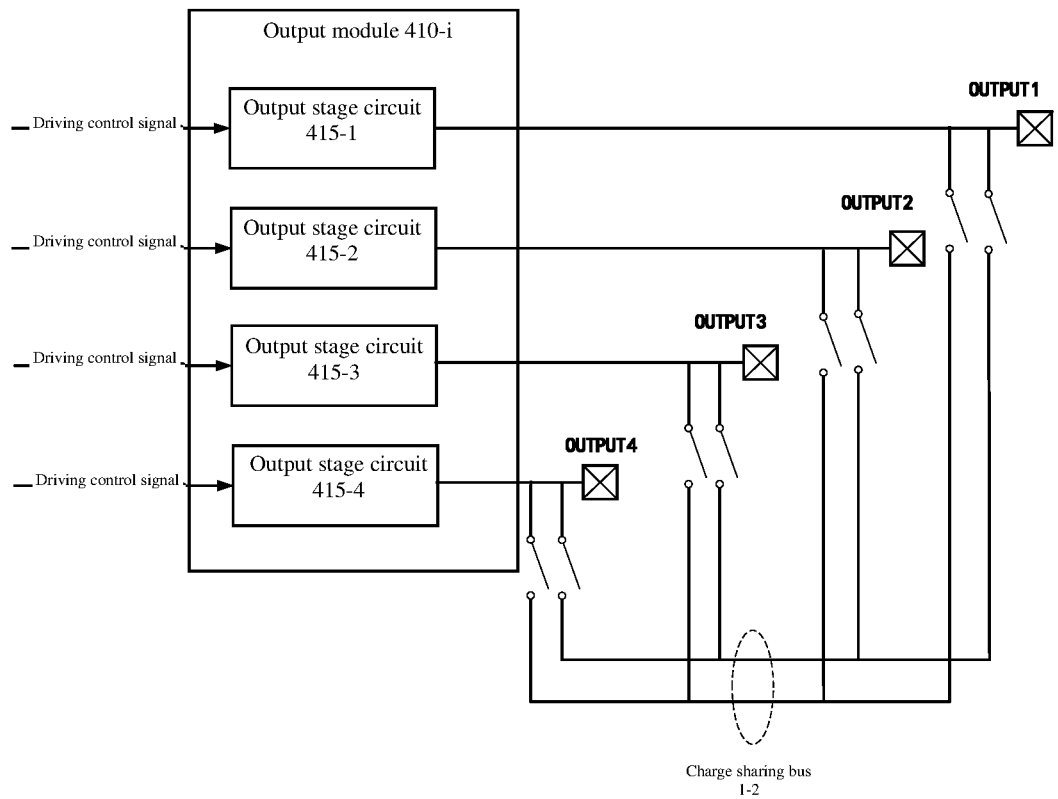

FIG. 7D shows an example in which there are two charge sharing buses, and there are four output stage circuits included in each output module, wherein, the output terminals OUTPUT1 to 4 of the first output stage circuit to the fourth output stage circuit are each connected to the two charge sharing buses via two path switches. When driving electrodes in the first driving electrode group connected with the output terminals of output stage circuits in the first output stage circuit group(e.g., the first output stage circuit and the second output stage circuit) are expected to charge driving electrodes in the second driving electrode group connected with the output terminals of output stage circuits in the second output stage circuit group (e.g., the third output stage circuit and the fourth output stage circuit), the two path switches corresponding to the first output stage circuit and the second output stage circuit are turned on in the first direction, and the two path switches corresponding to the third output stage circuit and the fourth output stage circuit are turned on in the second direction (or it is also feasible to turn on these path switches in both directions simultaneously), so that charging current flows via the charge sharing buses, and vice versa.

In the implementations described with reference to FIG. 7A to FIG. 7D, all driving electrodes to release power and all driving electrodes to be charged equalize charges thereof via the charge sharing bus, so as to implement the charge-discharge process. Therefore, it is no longer necessary to provide path switches between output terminals of every two output stage circuits or select charge-discharge combinations of the path switches, which, thus, may reduce the number of path switches, is favorable for circuit layout and circuit volume reduction, and may reduce complexity of control logic.

In the embodiments as described above with reference to FIG. 4 to FIG. 7D, the charge-discharge process between the driving electrodes is performed during the first time period; the first time period may be preset; for example, according to experience, a time length between a start point of each driving time period and a predetermined time point after the start point may be taken as a time length of the first time period. In addition, the first time period may also be determined according to the charge-discharge process between the driving electrodes, for example, according to a first voltage value group at the output terminal(s) of the first output stage circuit group (for discharging the first driving electrode group) and a second voltage value group at the output terminal(s) of the second output stage circuit group (for charging the second driving electrode group). For example, by providing a comparing unit, the controller determines a time length of the first time period according to a comparison result of the comparing unit with respect to these voltage values and control logic. The comparing unit may be a software-implemented controller internal logic or a hardware circuit (included in the controller or independent of the controller and in the touch driving apparatus, e.g., a comparing circuit such as a comparator).

Hereinafter, a schematic structure of the comparing unit in the touch driving apparatus used for the touch panel according to the embodiment of the present disclosure will be described with reference to FIG. 8 to FIG. 13, wherein, the comparing unit is configured to determine an end of the first time period during which the charge-discharge process between the driving electrodes is performed. The start point of the first time period is a start point of each driving time period, for example, a rising edge or a falling edge of a pulse of the driving signal.

It should be noted that the following is only exemplary description of how to use the comparing unit to determine the end of the charge-discharge process (the end of the first time period) according to the voltages at the output terminals of the output stage circuits; however, those skilled in the art should understand that other means other than the comparing unit or other settings of the comparing unit may also be adopted to determine the end of the charge-discharge process according to the voltages at the output terminals of the output stage circuits, without departing from the protection scope claimed in the present disclosure.

For example, in some implementations, the touch driving apparatus may include a plurality of comparing units; and for each comparing unit, one terminal receives a voltage value at an output terminal of an output stage circuit, and the other terminal receives a reference voltage value. When the number of output stage circuits whose output voltage values at respective output terminals and the corresponding reference voltage value each meet a threshold condition (e.g., a difference is small enough, e.g., the threshold is 0) is great enough, it is determined that the first time period ends. The reference voltage value may be determined according to a ratio of the number of driving electrodes to be charged and the number of driving electrodes to be discharged (to achieve charge-discharge equalization), or any other threshold corresponding to the threshold condition (without reaching charge-discharge equalization).

Figure 8:
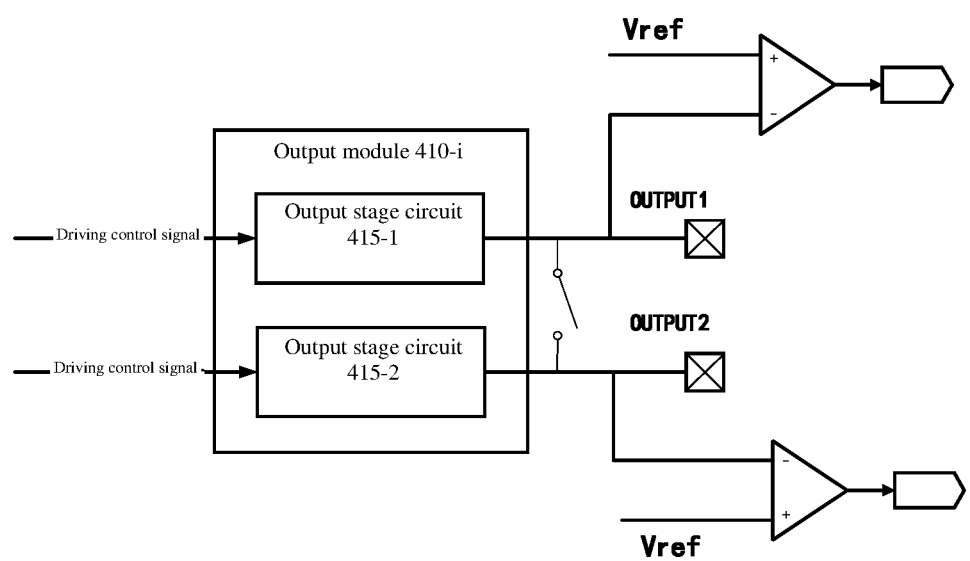

For example, as shown in FIG. 8, the first output stage circuit group includes the first output stage circuit, the second output stage circuit group includes the second output stage circuit, and there is a charge-discharge path between the first output stage circuit and the second output stage circuit (the switch between the two is turned on or the switches respectively connected to the charge sharing bus are turned on); the manner of determining the first time period in FIG. 8 and the subsequent drawings is exemplarily illustrated by taking the structure of the output module shown in FIG. 6A as an example, but it should be understood that the determining manner may be applied to other output modules (e.g., FIG. 6B to FIG. 7D). The first voltage value at the output terminal of the first output stage circuit and the second voltage value at the output terminal of the second output stage circuit are respectively compared with the reference voltage value (Vref, for example, TX VDD/2 or other preset reference values), if the difference between the first voltage value and the corresponding reference voltage value and the difference between the second voltage value and the corresponding reference voltage value are both within a threshold range, it is determined that the first time period ends. Of course, the end of the first time period may also be determined if at least one of the two differences is within the threshold range, and this depends on control logic design of the controller, which will not be limited in the present disclosure.

However, such determining manner requires a power supply that accurately generates the reference voltage value. When the number of output stage circuits in the output module is greater (there may be different ratios of the number of driving electrodes to be charged to the number of driving electrodes to be discharged), more reference voltage values may be required, and these reference voltage values need to be supplied by power supply circuits, which may lead to increased complexity of the circuit and control logic.

Therefore, in other implementation of the present disclosure, the first voltage value group output by the first output stage circuit group and the second voltage value group output by the second output stage circuit group may be used as the inputs of the comparing unit, instead of the reference voltage value.

For example, the touch driving apparatus may include at least one comparing unit. Each comparing unit of the at least one comparing unit compares one voltage value of the first voltage value group with a corresponding one voltage value of the second voltage value group, and outputs a comparison result indicating whether a voltage difference between the one voltage value of the first voltage value group and the corresponding one voltage value of the second voltage value group meets a threshold condition (e.g., the voltage difference between the two voltage values is within a threshold range, or the voltage difference between a voltage component of one voltage of the two voltages and the other one voltage is within a threshold range, etc.). When the number of comparison results indicating the threshold condition being met is greater than or equal to a first predetermined number, the controller 420 determines that the first time period ends.

Figure 9:
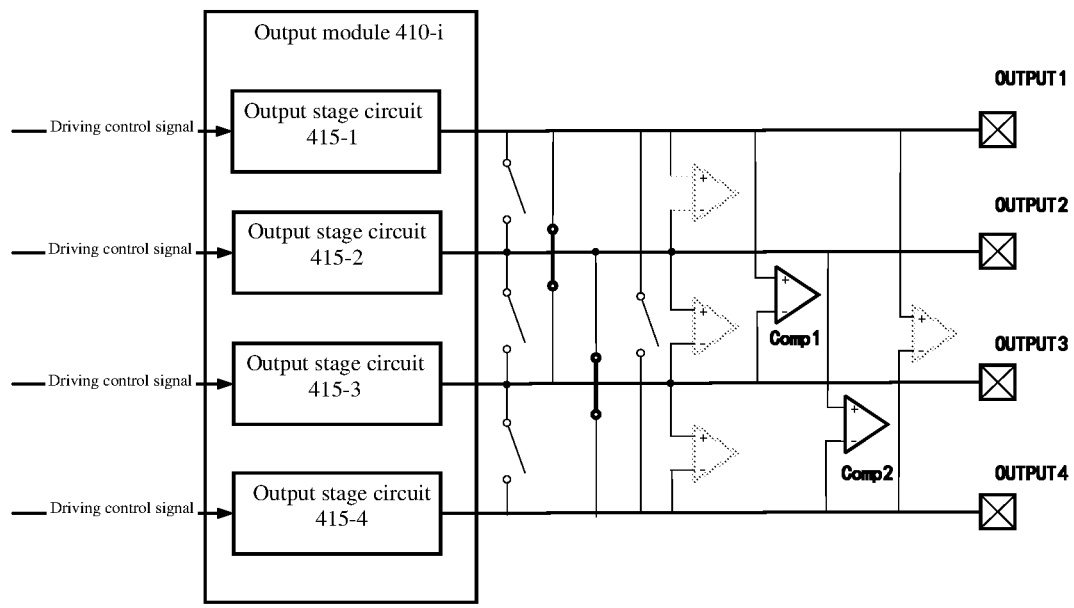

For example, as shown in FIG. 9, output terminals of every two output stage circuits of each output module are respectively connected to two input terminals of one comparing unit. The controller 420 may determine which comparing unit(s) should be enabled according to the determined path switch(s) which is turned on.

Optionally, the first preset number may be less than or equal to the number of the second voltage value groups, for example, half of the number of the second voltage value groups. Or, the first preset number may be, for example, half of the number of the first voltage value groups, which will not be limited in the present disclosure.

For example, the output module in FIG. 9 includes four output stage circuits, the first output stage circuit group includes the first output stage circuit 415-1 and the second output stage circuit 415-2, and the second output stage circuit group includes the third output stage circuit 415-1 and the fourth output stage circuit 415-2. Comparing units are provided between output terminals of every two output stage circuits (as shown in FIG. 6A above, there are also path switches to implement the charge-discharge paths). When the controller controls turning on the path switch between the output terminals of the first output stage circuit and the third output stage circuit (i.e., the driving electrode connected with the first output stage circuit discharges to the driving electrode connected with the third output stage circuit), and turning on a path switch between the output terminals of the second output stage circuit and the fourth output stage circuit (i.e., the driving electrode connected with the second output stage circuit discharges to the driving electrode connected with the fourth output stage circuit), the controller enables a comparator Comp1 and a comparator Comp2, two input terminals of the comparator Comp1 receive the voltage values of the output terminals of the first output stage circuit and the third output stage circuit, and two input terminals of the comparator Comp2 receive the voltage values of the output terminals of the second output stage circuit and the fourth output stage circuit. When the voltage values of the output terminals of the first output stage circuit and the third output stage circuit meet a threshold condition (e.g., a voltage difference of the two voltage values is within a threshold range) and the voltage values of the output terminals of the second output stage circuit and the fourth output stage circuit meet a threshold condition (e.g., a voltage difference of the two voltage values is within a threshold range), that is, the number of comparison results indicating the threshold conditions being met is 2 (equal to the number of the voltage values in the second voltage value group), according to the control logic design in the controller, the controller may determine that the first time period ends.

Of course, as described above, the driving electrodes to be charged and the driving electrodes to be discharged may not be in one-to-one correspondence with each other. For example, in FIG. 9, when the driving electrode corresponding to the first output stage circuit may simultaneously charge the driving electrodes corresponding to the third output stage circuit and the fourth output stage circuit, the controller needs to turn on the path switches from the output terminal of the first output stage circuit to the output terminals of the third output stage circuit and the fourth output stage circuit, and enable the comparing units connected between these output terminals. The second output stage circuit is also similar thereto. Then, according to the results of the comparing units and the control logic design in the controller, the controller 420 may determine that the first time period ends.

Additionally or alternatively, in a case where all output stage circuits included in each output module are each connected to at least one charge sharing bus via a path switch, the time length of the first time period may also be determined by providing comparing units similar to that described with reference to FIG. 8 or FIG. 9, that is, comparing units may be connected between every two output terminals, and the controller enables some of the comparing units according to the path switch(s) which is turned on.

However, considering that in the case of the at least one shared charging bus, the current in the charge-discharge process may flow between output terminals of any two output stage circuits corresponding to the driving electrodes to be charged and discharged via the at least one charge sharing bus, and design parameters of each output stage circuit are similar, therefore, in other implementations of the present disclosure, comparing units are not provided between output terminals of every two output stage circuits, but only a few comparing units, or even one comparing unit need to be provided.

For example, the touch driving apparatus includes at least one comparing unit. Each comparing unit has one input terminal connected with an output terminal of a first representative output stage circuit in the first output stage circuit group to receive a first representative voltage value, and the other input terminal connected with an output terminal of a second representative output stage circuit in the second output stage circuit group to receive a second representative voltage value, so as to obtain at least one comparison result; and when the number of comparison results indicating that the obtained first representative voltage value and the corresponding second representative voltage value meet a threshold condition is greater than or equal to a second preset number, the controller determines that the first time period ends.

Figure 10:
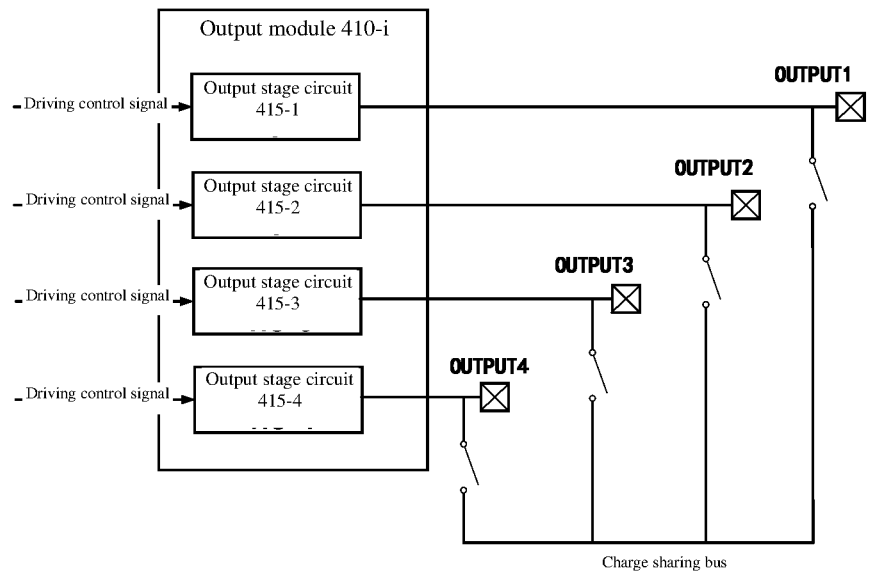
Figure 10:
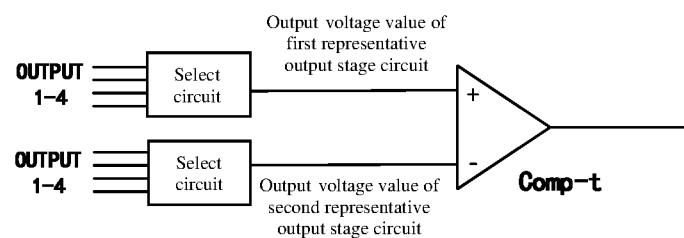

As shown in FIG. 10, the touch driving apparatus includes a comparing unit Comp-t. Of course, according to the number of output stage circuits in the output module, two or more comparing units may be provided, and the connection manner of the input terminals of each comparing unit and the output terminal of the output stage circuit is similar to that in FIG. 10.

In FIG. 10, it is illustrated by still taking that the output module includes four output stage circuits, the first output stage circuit group includes the first output stage circuit 415-1 and the second output stage circuit 415-2, and the second output stage circuit group includes the third output stage circuit 415-3 and the fourth output stage circuit 415-4 as an example. The comparing unit Comp-t has one input terminal connected to the output terminal of the first representative output stage circuit in the first output stage circuit group, and the other input terminal connected to the output terminal of the second representative output stage circuit in the second output stage circuit group. When the first representative voltage value at the output terminal of the first representative output stage circuit and the second representative voltage value at the output terminal of the second representative output stage circuit meet a threshold condition, the controller determines that the first time period ends.

For example, considering different combinations of output stage circuits in the first output stage circuit group and the second output stage circuit group, a determination manner of the first representative output stage circuit and the second representative output stage circuit under different possible combinations of output stage circuits may be pre-designed, as preset logic, in the controller. In a practical application process, when the first output stage circuit group and the second output stage circuit group are determined, the first representative output stage circuit and the second representative output stage circuit are determined according to the preset logic.

For example, the preset logic may include: with respect to a case where the first output stage circuit group includes the first output stage circuit and the second output stage circuit group includes the second output stage circuit to the fourth output stage circuit, the first representative output stage circuit is the first output stage circuit and the second representative output stage circuit is the third output stage circuit. For another example, with respect to a case where the first output stage circuit group includes the first output stage circuit to the second output stage circuit and the second output stage circuit group includes the third output stage circuit to the fourth output stage circuit, the first representative output stage circuit is the first output stage circuit and the second representative output stage circuit is the fourth output stage circuit; and so on. Of course, this is only an example, and the determination manner of the first representative output stage circuit and the second representative output stage circuit under different possible combinations of output stage circuits may be pre-designed according to various factors.

In addition, when the touch driving apparatus includes more than one comparing units, a determination manner of representative output stage circuits under different possible combinations of output stage circuits may be similarly pre-designed.

For example, when there are two comparing units, the preset logic may include: with respect to a case where the first output stage circuit group includes the first output stage circuit (i.e., 1 output stage circuit), and the second output stage circuit group includes the second output stage circuit to a sixth output stage circuit (i.e., 5 output stage circuits), the representative output stage circuit in the first output stage circuit group is the first output stage circuit, and its output voltage value serves as an input of each of comparing units 1 and 2; and, the two representative output stage circuits in the second output stage circuit group are the third output stage circuit and the fourth output stage circuit, and their output voltage values respectively serve as another input of each of comparing units 1 and 2. For another example, when there are two comparing units, with respect to a case where the first output stage circuit group includes the first output stage circuit to the third output stage circuit, and the second output stage circuit group includes the fourth output stage circuit to the sixth output stage circuit, the two representative output stage circuits in the first output stage circuit group are the first output stage circuit and the third output stage circuit, and respectively correspond to comparing units 1 and 2, the two representative output stage circuits in the second output stage circuit group are the fifth output stage circuit and the sixth output stage circuit, and respectively correspond to comparing units 1 and 2. Of course, this is only an example, and the determination manner of the first representative output stage circuit and the second representative output stage circuit under different possible combinations of output stage circuits may be pre-designed according to various factors.

For example, the determination manner may be pre-designed according to a charge/discharge speed of an output terminal of each output stage circuit, and the charge/discharge speed may be determined according to previous operation state records and/or system parameters of these output stage circuits. For example, the above-described first representative output stage circuit may be the one output stage circuit with the slowest discharging speed in the first output stage circuit group, and the second representative output stage circuit may be the one output stage circuit with the slowest charging speed in the second output stage circuit group. Optionally, the respective output stage circuits may be pre-ordered according to the charge/discharge speeds and system parameters, and the obtained order may be stored in the memory; when the first output stage circuit group and the second output stage circuit group are determined, the output stage circuit with the slowest discharging speed and the output stage circuit with the slowest charging speed respectively in the first output stage circuit group and the second output stage circuit group may be determined according to the order, as the representative output stage circuits.

Of course, the first representative output stage circuit and the second representative output stage circuit may also be determined in other manners.

In such implementation, the two input terminals of each comparing unit both need to be capable of being connected to each output stage circuit in the output module. In some examples, output terminals of all output stage circuits in the output module may be switchably connected with the two input terminals of each comparing unit through a one-to-more switching module. For example, a multi-selector or a multiplexer may be used, so that the controller may control which two output terminals (corresponding two output stage circuits) the two input terminals of each comparing unit should be connected to, by controlling the one-to-more switching module.

Figure 11:
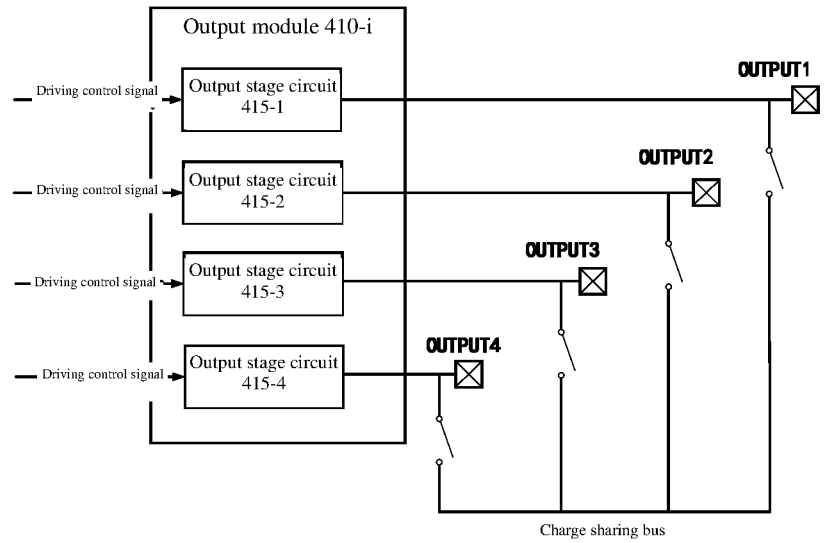
Figure 11:
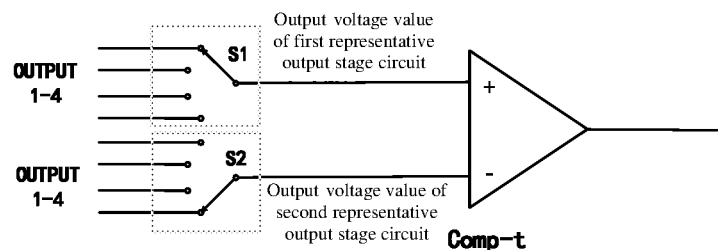

As shown in FIG. 11, each output stage circuit in the output module is connected to multi-selectors S1 and S2 or multiplexers MUX1 and MUX2 (not shown), outputs of multi-selectors S1 and S2 or multiplexers MUX1 and MUX2 are respectively connected to two input terminals of one comparing unit. The controller controls multi-selectors S1 and S2 or multiplexers MUX1 and MUX2 to switch for selection, so that the comparing unit may be provided with the first representative voltage value and the second representative voltage value at the output terminals of two output stage circuits. Of course, this is only an example, and it is also feasible to adopt other switching manners, which will not be limited in the present disclosure.

With respect to a case where both terminals of the comparing unit are connected with the output terminals of the output stage circuits, although most contents above are described with respect to a case where the charge-discharge process is stopped only when equalization between the driving electrodes to be charged and the driving electrodes to be discharged is reached, yet according to other implementations, the voltage values of the driving electrodes to be discharged and the driving electrodes to be charged are not necessarily equal (i.e., ideal charge-discharge equalization is not necessarily reached) so as to stop the charge-discharge process. For example, other conditions for determining the end of the first time period may be adopted according to actual needs. For example, in a case where one driving electrode discharges to another driving electrode, the first voltage value and the second voltage value on the discharging driving electrode and the charging driving electrode are not necessarily both TX VDD/2 (with an error range negligible) when determining end of the first time period (that the charge-discharge process should be stopped), but the end of the first time period may be determined when there is still a certain difference between the first voltage value and the second voltage value.

To this end, the comparing unit may include a scaling sub-unit, which is configured to scale a voltage value of one input terminal of the comparing unit, so that the scaled voltage value is compared with a voltage value of the other input terminal of the comparing unit. The conditions for determining the end of the first time period may be changed by presetting a scaling ratio. Optionally, the scaling sub-unit may be a voltage divider circuit or a software-implemented controller internal logic.

Figure 12:
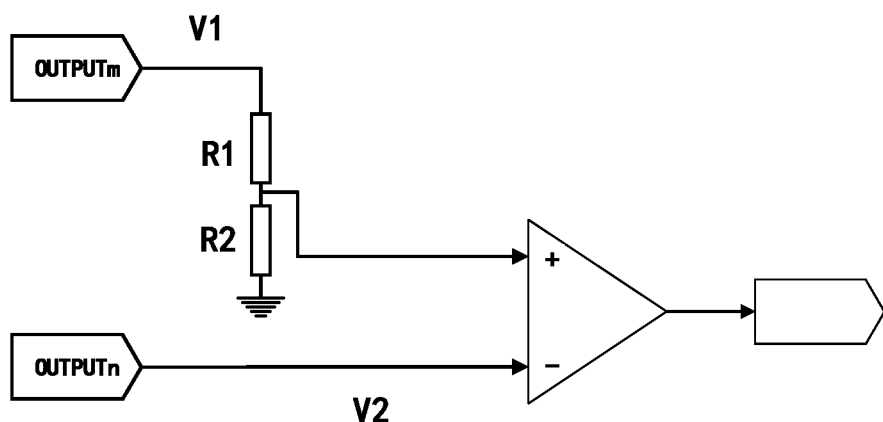

For example, FIG. 12 shows a structural schematic diagram including a comparing unit with a scaling sub-unit.

As shown in FIG. 12, after a voltage V1 at an output terminal OUTPUTm from one output stage circuit passes through a voltage divider circuit as a scaling sub-unit (e.g., implemented by connecting the resistors R1 and R2 in series), a scaled voltage V1*R2/(R1+R2) is input to one input terminal of the comparator, while a voltage V2 of an output terminal OUTPUTn of the other output stage circuit is input to another input terminal of the comparator, so that when the value of V1*R2/(R1+R2) is almost equal to the value of V2, the comparator outputs a comparison result indicating the end of the charge-discharge process between driving electrodes corresponding to the two output stage circuits (a voltage difference of the two voltages meets a threshold condition). At this time, when V1 and V2 are not equal, the comparator outputs the comparison result.

According to other implementation, the touch driving apparatus may include comparing units whose number is equal to the number of charge sharing buses; and the comparing units are in one-to-one correspondence with the charge sharing buses. Each of the comparing units has a first terminal connected with a corresponding charge sharing bus to obtain a bus voltage value, and has a second terminal to acquire the reference voltage value. At least one comparison result can be obtained. When the number of comparison results indicating that the bus voltage value acquired from the corresponding charge sharing bus and the reference voltage value meet a threshold condition is greater than or equal to a third preset number, the controller determines that the first time period ends.

Optionally, the reference voltage value may be associated with the number of output stage circuits included in the first output stage circuit group and the second output stage circuit group.

For example, as shown in FIG. 13, the two comparing units Comp12-1 and Comp12-2 have first terminals respectively connected to two charge sharing buses, and second terminals thereof respectively connected to a voltage source that supplies the reference voltage value. When a comparison result of at least one comparing unit indicates that a voltage difference between the bus voltage value and the reference voltage value Vref (e.g., when the number of output stage circuits included in the first output stage circuit group is equal to the number of output stage circuits included in the second output stage circuit group, Vref is TX VDD/2) is small enough (i.e., the third preset number is 1), the controller determines that the first time period ends.

The touch driving apparatus as described above with reference to FIG. 4 to FIG. 13 has at least following advantages: firstly, the plurality of output stage circuits corresponding to the plurality of driving electrodes on the touch panel are modularized, so that driving signals may be generated and controlled for each output module; secondly, by providing the path switch(es) between the driving electrodes, the charge-discharge process between the driving electrodes may be performed, which may further reduce power that the touch driving apparatus needs supply to the driving electrodes, and thus may reduce power consumption; next, all driving electrodes to release power and all driving electrodes to be charged equalize charges by utilizing the charge sharing bus, so as to implement the charge-discharge process, and therefore, it is no longer necessary to provide path switch(es) between output terminals of every two output stage circuits or select charge-discharge combinations, which, thus, may reduce the number of path switches, is favorable for circuit layout and circuit volume reduction, and may further reduce complexity of control logic, thereby possessing obvious advantages especially in the case of more than two output stage circuits; finally, in some embodiments, voltage values at output terminals of the output stage circuits are as the input terminals of the comparing unit(s), there is no need to provide one or more additional reference voltage sources, which simplifies circuit design; meanwhile, a scaling sub-unit is also provided in the comparing unit, so that the conditions for stopping the charge-discharge process between the driving electrodes may be flexibly designed, instead of stopping the charge-discharge process between the driving electrodes only when differences between voltage values of the driving electrodes to be charged and driving electrodes to be discharged are substantially equal (within a measurement error range).

According to another aspect of the present disclosure, there is further provided a method of the touch driving apparatus used for the touch panel as described above with reference to FIG. 4 to FIG. 13.

FIG. 14 shows a schematic flow chart of a method of a touch driving apparatus used for a touch panel according to an embodiment of the present disclosure. The touch panel includes a plurality of driving electrodes and a plurality of sensing electrodes intersecting with each other.

For example, in step S1410, a first output stage circuit group and a second output stage circuit group in the current driving time period are determined according to a Code Division Multiple Access (CDM) code matrix, wherein, a first driving signal group at output terminals of the first output stage circuit group is expected to discharge the first driving electrode group, and a second driving signal group at output terminals of the second output stage circuit group is expected to charge the second driving electrode group.

Or, without including the output stage circuit, in step S1410, a first driving electrode group and a second driving electrode group in the current driving time period are determined according to a Code Division Multiple Access (CDM) code matrix, wherein, the first driving electrode group includes one or more driving electrodes that are expected to be discharged in the current driving time period among the plurality of driving electrodes, and the second driving electrode group includes one or more driving electrodes that are expected to be charged in the current driving time period among the plurality of driving electrodes.

In step S1420, in response to the determination, it is controlled to utilize power from the first driving electrode group to charge the second driving electrode group.

Optionally, the plurality of driving electrodes are divided into at least one group; each group corresponds to an output module; each output module includes at least two output stage circuits; and each output stage circuit outputs a driving signal to the connected driving electrode based on the driving control signal. The method shown in FIG. 14 is carried out for each output module, that is, the Code Division Multiple Access (CDM) code matrix corresponds to each output module; and for each output module, the output terminal(s) of the first output stage circuit group is connected with the first driving electrode group, and the output terminal(s) of the second output stage circuit group is connected with the second driving electrode group.

Optionally, similar to the contents as described above with reference to FIG. 4 to FIG. 13, specifically, in step S1420, the first output stage circuit group and the second output stage circuit group are controlled to utilize power from the first driving electrode group to charge the second driving electrode group up to the first time period; and after the first time period, the first output stage circuit group and the second output stage circuit group are controlled so that remaining power from the first driving electrode group is released to the low-level power supply terminal, and the second driving electrode group continue to be charged by utilizing the power from the high-level power supply terminal.

For example, in order to implement the path for current to flow, at least one path switch is provided between output terminals of every two output stage circuits in the output stage circuits included in each output module. Within the first time period, the controller disables the first output stage circuit group and the second output stage circuit group, and controls turning on at least part of the path switch (es), so that power from the first driving electrode group charges the second driving electrode group. After the first time period, the controller enables an conductive path(s) between the output terminal(s) of the first output stage circuit group and the low-level power supply terminal as well as an conductive path(s) between the high-level power supply terminal and the output terminal(s) of the second output stage circuit group, and controls turning off the at least part of the path switches.

More details of the method shown in FIG. 14 are the same or similar to the contents described above for the touch driving apparatus used for the touch panel. Due to the description above, no details will be repeated here.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

Several points below need to be explained:

(1) The drawings of the embodiments of the present disclosure relate only to the structures involved in the embodiments of the present disclosure, and normal designs may be referred to for other structures.

(2) In case of no conflict, the embodiments of the present disclosure and the features in the embodiments may be combined with each other to obtain a new embodiment.

The above are only specific embodiments of the present disclosure, but the scope of the embodiment of the present disclosure is not limited thereto, and the scope of the present disclosure should be the scope of the following claims.

The invention claimed is:

1. A touch driving apparatus used for a touch sensor, wherein, the touch sensor comprises a plurality of driving electrodes and a plurality of sensing electrodes intersecting with each other, and the touch driving apparatus comprises:
at least one output module, each output module comprising at least two output stage circuits, each output stage circuit having an output terminal configured to output a driving signal to a connected driving electrode;

a controller, configured to: for each output module, determine a first output stage circuit group and a second output stage circuit group in the current driving time period according to a Code Division Multiple Access (CDM) code matrix, wherein, a first driving signal group at an output terminal of the first output stage circuit group is expected to discharge a first driving electrode group, and a second driving signal group at an output terminal of the second output stage circuit group is expected to charge a second driving electrode group; and control utilizing power from the first driving electrode group to charge the second driving electrode group, in response to the determination.

2. The touch driving apparatus according to claim 1, wherein, the controller controls the first output stage circuit group and the second output stage circuit group, to:

utilize the power from the first driving electrode group to charge the second driving electrode group up to a first time period; and after the first time period, release remaining power from the first driving electrode group to a low-level power supply terminal, and utilize a high-level power supply terminal to charge the second driving electrode group.

3. The touch driving apparatus according to claim 2, further comprising: at least one path switch, arranged between output terminals of every two output stage circuits in the at least two output stage circuits, wherein, in the first time period, the controller disables the first output stage circuit group and the second output stage circuit group, and controls turning on at least part of the at least one path switch, so that the power from the first driving electrode group charges the second driving electrode group; and after the first time period, the controller enables a conductive path between the output terminal of the first output stage circuit group and a low-level power supply terminal as well as a conductive path between a high-level power supply terminal and the output terminal of the second output stage circuit group, and controls turning off the at least part of the at least one path switch.

4. The touch driving apparatus according to claim 3, further comprising: at least one charge sharing bus, wherein, an output terminal of each output stage circuit in the at least two output stage circuits is connected to the at least one charge sharing bus via a corresponding path switch, and each path switch is a single bidirectional conductive switch or a pair of unidirectional conductive switches with reverse conductive directions.

5. The touch driving apparatus according to claim 4, wherein, a duration of the first time period is preset, or an end of the first time period is determined according to a first voltage value group at the output terminal of the first output stage circuit group and a second voltage value group at the output terminal of the second output stage circuit group.

6. The touch driving apparatus according to claim 5, wherein, the touch driving apparatus comprises at least one comparing unit; and each comparing unit compares one voltage value of the first voltage value group with a corresponding one voltage value of the second voltage value group, and outputs a comparison result indicating whether a voltage difference between the one voltage value of the first voltage value group and the corresponding one voltage value of the second voltage value group meets a threshold condition, wherein, when a number of comparison results indicating the threshold condition being met is greater than or equal to a first preset number, the controller determines that the first time period ends.

7. The touch driving apparatus according to claim 6, wherein, output terminals of every two output stage circuits are respectively connected to two input terminals of one comparing unit;

wherein, the controller determines a comparing unit to be enabled according to the determined conductive path switch which is turned on.

8. The touch driving apparatus according to claim 5, wherein, the touch driving apparatus comprises at least one comparing unit, each comparing unit has a first input terminal connected with an output terminal of a first representative output stage circuit in the first output stage circuit group to obtain a first representative voltage value, and a second input terminal connected with an output terminal of a second representative output stage circuit in the second output stage circuit group to obtain a second representative voltage value, so to obtain at least one comparison result; and when a number of comparison results indicating that the first representative voltage value and a corresponding second representative voltage value meet a threshold condition is greater than or equal to a second preset number, the controller determines that the first time period ends.

9. The touch driving apparatus according to claim 6, wherein, the comparing unit comprises a scaling sub-unit, configured to scale a voltage value at a first input terminal of the comparing unit, to compare the scaled voltage value with a voltage value at a second input terminal of the comparing unit.

10. The touch driving apparatus according to claim 8, wherein, the comparing unit comprises a scaling sub-unit, configured to scale a voltage value at a first input terminal of the comparing unit, to compare the scaled voltage value with a voltage value at a second input terminal of the comparing unit.

11. The touch driving apparatus according to claim 5, wherein, the touch driving apparatus comprises at least one comparing unit in one-to-one correspondence to the at least one charge sharing bus, each comparing unit has a first terminal connected with a corresponding charge sharing bus to obtain a bus voltage value, and a second terminal to obtain a reference voltage value, so to obtain at least one comparison result, wherein the reference voltage value is associated with a number of output stage circuits included in the first output stage circuit group and the second output stage circuit group;

when a number of comparison results indicating that a bus voltage value obtained from a corresponding charge sharing bus and the reference voltage value meet a threshold condition is greater than or equal to a third preset number, the controller determines that the first time period ends.

12. The touch driving apparatus according to claim 2, wherein, each output stage circuit comprises a first switch and a second switch connected in series between the high-level power supply terminal and the low-level power supply terminal; and a connection node of the first switch and the second switch is connected to an output terminal of the output stage circuit;

the controller controls turning off the first switch and the second switch of each output stage circuit in the first output stage circuit group and the second output stage circuit group within the first time period; and after the first time period, the controller controls turning on the first switch and turning off the second switch of each output stage circuit in the second output stage circuit group, to utilize power from the high-level power supply terminal to charge the driving electrode connected to the output stage circuit via the first switch, and controls turning on the second switch and turning off the first switch of each output stage circuit in the first output stage circuit group, to release remaining power from the driving electrode connected to the output stage circuit to the low-level power supply terminal via the second switch.

13. The touch driving apparatus according to claim 1, wherein, the controller determines an expected driving signal corresponding to each driving electrode according to the CDM code matrix, wherein, each expected driving signal comprises a plurality of driving time periods, and a duration of each driving time period is half of the cycle of the driving signal, for each driving time period, the controller determines the first output stage circuit group and the second output stage circuit group based on the determined expected driving signal corresponding to each driving electrode.

14. The touch driving apparatus according to claim 1, wherein, there are a plurality of output modules, and each output module is connected to a driving electrode group, and the number of driving electrodes in the driving electrode group is equal to the number of output stage circuits included in the output module.

15. A touch control apparatus, comprising:

a touch panel, comprising a touch sensor comprising a plurality of driving electrodes and a plurality of sensing electrodes intersecting with each other;

the touch driving apparatus according to claim 1, wherein, the touch driving apparatus is configured to supply driving signals to the plurality of driving electrodes on the touch panel.

16. A touch driving method used for a touch sensor, wherein, the touch sensor comprises a plurality of driving electrodes and a plurality of sensing electrodes intersecting with each other; the plurality of driving electrodes are divided into at least one group; each group corresponds to an output module; and each output module comprises output stage circuits whose number is equal to that of driving electrodes of each group, the method comprises: for each output module, determining a first output stage circuit group and a second output stage circuit group in the current driving time period according to a Code Division Multiple Access (CDM) code matrix, wherein, a first driving signal group at an output terminal of the first output stage circuit group is expected to discharge a first driving electrode group, and a second driving signal group at an output terminal of the second output stage circuit group is expected to charge a second driving electrode group; and controlling utilizing power from the first driving electrode group to charge the second driving electrode group, in response to the determination.

17. The touch detecting method according to claim 16, wherein, the controlling utilizing power from the first driving electrode group to charge the second driving electrode group, comprises:

controlling utilizing the power from the first driving electrode group to charge the second driving electrode group up to the first time period; and after the first time period, controlling releasing remaining power from the first driving electrode group to a low-level power supply terminal, and utilizing a high-level power supply terminal to continue to charge the second driving electrode group.

18. The touch detecting method according to claim 16, wherein, at least one path switch is provided between output terminals of every two output stage circuits included in each output module, the controlling utilizing the power from the first driving electrode group to charge the second driving electrode group, further comprises:

in the first time period, disabling, by the controller, the first output stage circuit group and the second output stage circuit group, and controlling turning on at least part of the at least one path switch, so that the power from the first driving electrode group charges the second driving electrode group; and after the first time period, enabling, by the controller, a conductive path between the output terminal of the first output stage circuit group and the low-level power supply terminal as well as a conductive path between the high-level power supply terminal and the output terminal of the second output stage circuit group, and controlling turning off the at least part of the at least one path switch.

* * * * *